(12) United States Patent
Hull

(10) Patent No.: US 6,386,796 B1
(45) Date of Patent: May 14, 2002

(54) COMPOSITE PARTICLES AND METHODS FOR THEIR APPLICATION AND IMPLEMENTATION

(76) Inventor: John H. Hull, 3554 Edgevale, Toledo, OH (US) 43606

( * ) Notice: Subject to any disclaimer, the term of this patent is extended or adjusted under 35 U.S.C. 154(b) by 0 days.

(21) Appl. No.: 09/515,031

(22) Filed: Mar. 6, 2000

(51) Int. Cl.[7] ................................................ B09C 1/02
(52) U.S. Cl. ............................. 405/128.25; 405/128.1
(58) Field of Search ................................ 405/128, 129, 405/270, 128.15, 128.2, 128.25, 128.3, 128.45, 128.5, 128.7, 128.75, 258.1

(56) References Cited

U.S. PATENT DOCUMENTS

| | | | |
|---|---|---|---|
| 2,277,286 A | | 3/1942 | Bechtner .......................... 61/30 |
| 2,728,733 A | | 12/1955 | Hashimoto ................... 252/449 |
| 4,011,175 A | | 3/1977 | Preus ........................... 252/427 |
| 4,252,462 A | * | 2/1981 | Klingle et al. ............... 405/129 |
| 4,323,367 A | * | 4/1982 | Ghosh .......................... 405/129 |
| 4,790,940 A | | 12/1988 | Castaldi et al. .............. 210/611 |
| 5,035,804 A | | 7/1991 | Stowe ........................ 210/671 |
| 5,112,665 A | | 5/1992 | Alexander ................... 428/102 |
| 5,127,765 A | | 7/1992 | Millgard ...................... 405/128 |
| 5,256,001 A | | 10/1993 | Millgard ...................... 405/128 |
| 5,259,697 A | * | 11/1993 | Allen et al. .................. 405/129 |
| 5,286,140 A | * | 2/1994 | Mather ........................ 405/128 |
| 5,458,747 A | | 10/1995 | Marks et al. ................ 205/702 |
| 5,481,815 A | | 1/1996 | Murphy et al. ................ 37/344 |
| 5,538,787 A | | 7/1996 | Nachtman et al. ........... 428/323 |
| 5,562,586 A | * | 10/1996 | Hyde-Smith ................ 405/129 |
| 5,564,862 A | * | 10/1996 | Markels, Jr. ................. 405/129 |
| 5,605,417 A | * | 2/1997 | Englert et al. ............... 405/129 |
| 5,700,685 A | | 12/1997 | Murphy ..................... 435/262.5 |
| 5,753,494 A | * | 5/1998 | Hater et al. .................. 405/128 |
| 5,857,807 A | * | 1/1999 | Longo, Sr. ................... 405/129 |
| 5,897,946 A | | 4/1999 | Nachtman et al. ........... 428/323 |
| 5,984,580 A | * | 11/1999 | Ham et al. ................... 405/129 |
| 6,024,513 A | * | 2/2000 | Hudgins et al. ............. 405/129 |

FOREIGN PATENT DOCUMENTS

| | | | |
|---|---|---|---|
| DE | A-3908628 | 9/1990 | ........... E02D/31/00 |
| EP | A-0567692 | 11/1993 | ........... E02D/31/00 |
| GB | 1053036 | 5/1965 | |

OTHER PUBLICATIONS

USDA Den. Wild. Res. Ctr. Tech. Rep., pp. 429–444 (Jan. 1995).
Pollutant Absorption Underwater, pp. 1–31 (Aug. 1996).

* cited by examiner

Primary Examiner—David Bagnell
Assistant Examiner—Frederick L. Lagman
(74) Attorney, Agent, or Firm—MacMillan, Sobanski & Todd, LLC

(57) ABSTRACT

A method of treating a contaminated material in which a low-permeability barrier is formed over the contaminated material, thereby creating a substantially hydraulically closed system. The material beneath the barrier is treated by at least one of delivering a substance to treat the contamination and removing flowable material from beneath the barrier. The invention also relates to compositions and properties of composite particles suitable for the treatment method, additional methods of implementing the composite particles, and methods of applying the composite particles.

32 Claims, 6 Drawing Sheets

US 6,386,796 B1

COMPOSITE PARTICLES AND METHODS FOR THEIR APPLICATION AND IMPLEMENTATION

BACKGROUND OF THE INVENTION

The invention relates generally to materials for sealing, isolating, treating or minimizing erosion of a surface, and more particularly to hydratable composite particles which are effective for these and other applications.

A significant number of lakes, ponds, reservoirs, lagoons, marshes, river beds and ocean areas near coastlines are contaminated with environmentally hazardous materials. Examples of such materials include polychlorinated biphenyls ("PCB's"), white phosphorus, synthetic organic compounds, and various metals. Many of these materials, once introduced by one means or another, settle on the bottoms of such bodies of water and become attached to sediments. The resulting contaminated sediments are detrimental to the ecosystem, especially wildlife which utilizes the body of water, such as fish, foraging waterfowl and small vertebrates and invertebrates. In some cases the contaminants are slowly released from the sediments and re-introduced into the water column. Such sediment-borne contaminants can also adversely impact wetland or deepwater ecosystems indirectly through food-chain effects.

In some cases, it is not feasible to remove or treat such contaminated sediments in place, or in situ. Thus, to restrict wildlife and other organisms from coming into contact with the contaminated sediments and to seal or isolate the sediments from coming into contact with the water column, it has been proposed to form an underwater barrier layer over the contaminated sediments. Previous methods have been relatively difficult and expensive to install, and have been susceptible to damage. Thus, an effective method of sealing or isolating the contaminated sediments is needed. Preferably, an effective method would also be beneficial in minimizing leakage losses from the surface-water body, and in minimizing potential impacts to ground water when the water body contains dissolved contaminants.

Contaminated sediments occur in wetland as well as deepwater (non-vegetated) environments characterized by freshwater or saline (including brackish) conditions. Remedial dredging and removal of sediments is an often used ex-situ approach for addressing this issue. A number of environmental impacts are known to be associated with remedial dredging, including re-suspension of contaminated sediments into the overlying water column and incomplete removal of sediment contaminants from the uppermost, and most biologically active, layers. Remedial dredging of wetland sediments, in particular, could also severely impact or destroy a wetland ecosystem and compromise related wetland functions. Therefore, other less-invasive but equally effective remediation technologies, or alternatives, for addressing contaminated sediments in deepwater or wetland environments are needed.

High-flow conditions can periodically occur along a variety of manmade and naturally occurring waterways, including along drainage ditches or channels, near culvert inlets and outfalls, and in some riverine environments. Such conditions can result in significant scour and erosional losses of exposed bottom substrates. Erosion of basal substrates can also subsequently result in failure of the conveyance system and, in some cases, detrimental buildup of displaced and re-deposited sediments in downstream locations. An effective method for erosion control is needed.

When subsurface pipelines (including culverts) are installed, the pipelines are typically bedded in stone or sand bedding material that can act as a conduit for the migration of water and/or contaminants. In the case of pipelines piercing a dam or levee, a continuous hydraulic (low-permeability) seal is required between the pipe and its immediate surroundings; such a seal minimizes the potential for leakage of municipal water supplies. In the case of contaminated site remediation, sewage, petroleum products, or other contaminants can flow through the bedding material into adjacent geologic or soil material. The greatest potential for leakage typically occurs at joints between pipe sections, although leakage can also occur along the pipe body, where cracks or ruptures have developed. Effective pipeline sealing also minimizes the potential for movement of ground waters or other fluids into the conveyance structure, which could have particular relevance in areas where ground water tables are high (such as in wetlands) and/or where ground water is contaminated. An effective method for pipeline sealing is needed.

A low-permeability, hydraulic seal is also required during the construction of ground water monitoring and extraction wells and in the petroleum and brine drilling and extraction industry to minimize the potential for vertical transfer of contaminated ground water, oil, or brine along the well's annular space. Such transfers could result in pollutant migration into adjacent aquifers.

Landfill sites are typically constructed by completing an excavation in the ground and lining the excavation to form a containing system prior to filling with waste materials. Unfortunately, the landfill is susceptible to leaching contaminants into the surrounding ground and possibly into the water table. The upper surface of the landfill attracts pests such as birds and rodents which can possibly carry diseases.

SUMMARY OF THE INVENTION

This invention relates to a method of treating a contaminated material. In the method, a low-permeability barrier is formed over the contaminated material, thereby creating a substantially hydraulically closed system. The material beneath the barrier is treated by at least one of delivering a substance to treat the contamination and removing flowable material from beneath the barrier.

The invention also relates to a method of applying a flowable material comprising a plurality of manufactured composite particles including a sealant material. In the method, the composite particles are applied with a conveyor across an established grid system in an environment which is subaerial or subaqueous. The subaqueous environments include deepwater or wetland environments characterized by freshwater to saline conditions.

The invention also relates to another method of applying the composite particles. In the method, the composite particles are applied by aircraft equipped with at least one drop bag. The composite particles are applied from a bag across an established grid system in an environment which is subaerial or subaqueous. The subaqueous environments include deepwater or wetland environments characterized by freshwater to saline conditions.

The invention also relates to another method of applying the composite particles. In the method, the composite particles are applied with a clamshell bucket. The composite particles are applied across an established grid system in an environment which is subaerial or subaqueous. The subaqueous environments include deepwater or wetland environments characterized by freshwater to saline conditions.

The invention also relates to a method of applying a flowable material to form a sealant layer on an underwater surface including contaminated sediments. The flowable material comprises a plurality of manufactured composite particles including a sealant material. In the method, a layer of sand-sized material or other material is applied over the surface prior to applying the composite particles to reduce sediment re-suspension upon particle impact, and to minimize penetration and settling of particles into the surface.

The invention also relates to a method of creating a seal in a subsurface environment. In the method, a plurality of manufactured composite particles are placed in the subsurface environment, the composite particles including a sealant material. The sealant material is hydrated to create the seal.

The invention also relates to a method of controlling erosion of a subaqueous surface. In the method, a plurality of manufactured composite particles are placed around erosion-control objects on the surface, the composite particles including a sealant material. The sealant material physically stabilizes the erosion-control objects on the surface.

The invention also relates to a flowable material comprising a plurality of manufactured composite particles. Each composite particle comprises a core, and a sealant layer at least partially encapsulating the core. The sealant layer comprising sealant material capable of at least one of absorbing water, swelling, and reacting. The core is less dense and softer than the sealant layer. The composite particle has a specific gravity greater than one.

The invention also relates to another embodiment of a flowable material comprising a plurality of manufactured composite particles. Each composite particle comprises a core and a sealant layer at least partially encapsulating the core. The sealant layer comprises sealant material capable of at least one of absorbing water, swelling, and reacting. The sealant layer comprises a combination of a clay mineral and other material comprised of quasi clay-sized particles, the quasi clay-sized particles having an average particle size of less than about 10 microns.

The invention also relates to another embodiment of the flowable material. In this embodiment, the sealant layer comprises a combination of sand-sized material and at least one of a clay mineral and another material comprised of clay-sized particles.

The invention also relates to another embodiment of the flowable material. In this embodiment, at least one of the core and the sealant layer contains an oxidizing agent.

The invention also relates to another embodiment of the flowable material. In this embodiment, the flowable material has an air-dry bulk density within a range of from about 60 to about 100 pounds per cubic foot.

The invention also relates to another embodiment of the flowable material. In this embodiment, the composite particles have an average particle diameter less than about 0.19 inch to provide a moisture content which is higher than the moisture content of larger diameter composite particles.

The invention also relates to another embodiment of the flowable material. In this embodiment, the composite particles, when dropped through a water column onto a surface, have the property of dispersing laterally to form a substantially uniform spatial distribution of particles on the surface.

The invention also relates to another embodiment of the flowable material. In this embodiment, the sealant layer forms a barrier layer having a low permeability, and the presence of significant quantities of core material in the barrier layer has an insignificant effect on the permeability of the barrier layer.

The invention also relates to another embodiment of the flowable material. In this embodiment, the sealant layer forms a barrier layer having a permeability of less than about $1 \times 10^{-6}$ cm/sec in saline conditions.

The invention also relates to another embodiment of the flowable material. In this embodiment, the sealant layer forms an underwater barrier layer which is substantially resistant to water flow velocities within a range from about 1 ft/sec to about 6 ft/sec.

The invention also relates to another embodiment of the flowable material. In this embodiment, the sealant layer has an average wet bulk density within a range of from about 1.1 to about 1.7 grams per cubic centimeter and an average moisture content within a range of from about 80% to about 200%.

Various objects and advantages of the invention will become readily apparent to those skilled in the art from the following detailed description of preferred embodiments when considered in the light of the accompanying drawings.

DETAILED DESCRIPTION OF THE PREFERRED EMBODIMENTS

Figure 1:
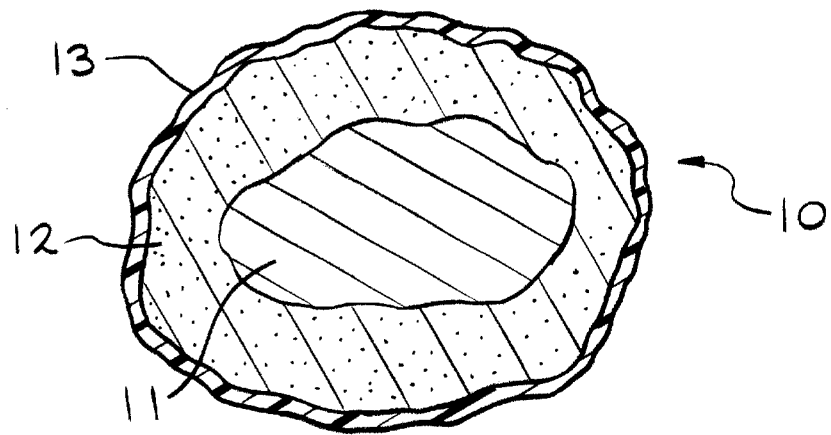
FIG. 1 is a sectional view of a single composite particle for forming a barrier layer in accordance with the invention.

Referring now to the drawings, FIG. 1 illustrates a preferred embodiment of a composite particle, indicated generally at 10, for forming a barrier layer in accordance with this invention. Composite particles 10 in accordance with the invention are sold under the tradename AQUABLOK by AQUABLOK, Ltd., Toledo, Ohio. As will be discussed in detail below, a plurality of such composite particles 10 form an effective barrier layer. The composite particles easily flow from a bucket, conveyor, drop bag, chute, pipeline or other distribution apparatus, and they may quickly sink in water to form a barrier layer over an underwater surface. Other methods for application and implementation of the composite particles are described below.

For example, the composite particles can also be distributed to form an effective barrier layer on a land surface such as at a sanitary landfill, hazardous waste site, or newly excavated pond or reservoir. When used as a cap at a landfill site, the composite particles can be dumped on the landfill surface and then leveled out to form a barrier layer, or applied by other means. Preferably, the materials comprising the composite particles are relatively uniformly distributed in the barrier layer. This is an important quality control issue for barrier layers at landfill sites. The barrier layer also keeps pests such as birds and rodents away from the covered waste material.

Preferably, a barrier layer in accordance with this invention has a low water permeability so that it is resistant to leakage of water and dissolved contaminants. When hydrated, the barrier layer preferably has a water permeability of less than $1\times10^{-7}$ cm/sec. under a minimum hydraulic gradient of 1 cm/cm according to ASTM Method D 5084.

The size of the composite particle 10 can range from a small pebble to a large size rock or even larger. Preferably the composite particle is generally spherical in form, but it can also be other shapes such as oval, oblong or irregular. The composite particle is formed of a core 11 which is at least partially encapsulated by a sealant layer 12. The core is preferably completely encapsulated by the sealant layer. In a preferred embodiment, a protective coating 13 is provided over the sealant layer 12. Each composite particle has a specific gravity which is greater than one.

The core 11 of the composite particle 10 is formed of a piece of a material which is usually relatively dense and preferably relatively hard when compared to the sealant layer 12. The core is usually relatively dense because it usually acts as a carrier of the composite particle to the isolated or treated surface. Examples of suitable materials for forming the core include pieces of rock or stone, iron ore, slag, glass cullet, crushed glass or crushed porcelain. Preferably, the core of the composite particle is formed of a piece of gravel or other solid aggregate. For some specific project applications, a less dense core (e.g., perlite) relative to the sealant layer may be used, although the specific gravity of the composite particle, as a whole, is greater than one.

In another embodiment, where the invention is used as an underwater barrier layer, the core of the composite particle is formed of a degradable material so that it can slowly dissipate over a period of time. The use of a degradable core offers some advantages. It facilitates hydraulic dredging operations. A degradable core also allows the underwater surface to be replenished with a new barrier layer from time to time, such as for revegetation of the surface. As will be discussed below, a degradable core can also deliver remediation/restoration materials to the underwater surface.

Various materials can be used to form a degradable core so long as the core remains relatively dense compared to the sealant layer and the composite particle as a whole has a specific gravity greater than one. Sand is a preferred material for forming a degradable core. The sand will function as a carrier of the composite particle to an underwater surface, and when hydrated it will disperse into the material of the sealant layer. Other suitable materials for the degradable core include very small stones or rocks, rubber tire chips, sugar-based materials such as rock candy, pelletized recycled paper such as magazines or newspapers, pelletized clay mineral that hydrates very slowly, or high-density fertilizer. These materials can be held together by a binder, such as those used in the sealant layer, to create any size core needed.

The core of the composite particle can also be formed of pozzolanic materials such as gypsum, gypsum fines, portland cement, cement kiln dust, lime dust, stone dust, fly ash, and plaster of Paris. These materials will be described in more detail below.

The core 11 of the composite particle 10 is at least partially encapsulated by a sealant layer 12. The material in the sealant layer acts as the main barrier for the contaminants on the isolated surface. A preferred type of material for the sealant layer is a clay mineral, or a mixture of clay minerals, which exhibits a high absorption and swelling capacity upon hydration. Preferably a dry clay mineral is used in the sealant layer. This material is composed of negatively charged, extremely small clay mineral particles that have a very large ratio of surface area to mass. These properties make the dry clay mineral hydrate readily when exposed to water, expanding into a cohesive, plastic soil mass with very low permeability. The clay mineral can be a bentonite clay which is readily hydratable, such as calcium bentonite or sodium bentonite. In certain applications, especially in waters having a relatively high salt content such as in brackish or seawater environments, the sealant layer may include a special combination of clay minerals and/or other clay sized particles including, but not necessarily limited to, bentonite, attapulgite, kaolinite, and/or gypsum. By "clay sized" is meant a material having an average particle size of less than about 10 microns, typically less than about 5 microns, and sometimes less than about 2 microns. The sealant layer may also contain other clay or quasi-clay sized materials to facilitate sediment treatment and/or sorption of particular dissolved contaminants; such other clay sized materials may include organophylic bentonite ("organo clays"); zeolites; inorganic oxides or other forms of aluminum, iron, (including and/or manganese; humic substances; and/or activated carbon.

A clay based sealant layer forms a soft underwater barrier layer that may slowly dissipate into the water over a prolonged period of time, depending on erosional conditions at a given site. On some underwater surfaces, it may be desirable to form a more permanent underwater barrier layer which forms a relatively hard, impermeable shell over the contaminated surface. In these cases, the barrier layer would form a hard crust barrier that is more like concrete than a soft clay based material. Such a barrier layer would be useful, for example, on underwater surfaces that require positive resistance to current flow or underwater turbulence.

A pozzolanic material can be used in the sealant layer to create such a hardened barrier layer. The term "pozzolanic material" means a material that is capable of setting and hardening under water. Suitable pozzolanic materials include gypsum, gypsum flues, portland cement, cement kiln dust, lime dust, stone dust, fly ash, and plaster of Paris. Gypsum, portland cement and its cement kiln dust byproduct are preferred. Fly ash is soot and ash produced by burning wood or coal or other biomass fuels. The setting nature of the pozzolanic material creates a more hardened, permanent barrier layer. These materials can be used in place of the relatively softer clay based material, or they can be used in mixtures with the clay mineral to create intermediate hardness barrier layers.

Optionally, the sealant layer 12 can also include a binder. The binder promotes the adhesion of the sealant layer to the core 11. When used, an amount of the binder sufficient to bind the sealant layer to the core is mixed with the sealant material. Alternatively, a layer of the binder may be interposed between the sealant material and the core. The binder also acts as a retardant to inhibit setting or expanding of the sealant material until it is positioned on the underwater surface. The binder is preferably a polymeric material, such as a cellulosic polymer. A preferred cellulosic polymer is guar gum. Other preferred cellulosic polymers include hydroxyethyl cellulose polymer and carboxymethyl cellulose polymer. Other suitable binders include glues such as 3M organic solvent glue, lignites (sap) from trees such as those marketed by Arizona Chemical, starch grafted polyacrylates such as Sanwet marketed by Hoechst Celanese, and soybean oil lecithins and their derivatives.

Water is another suitable binder, but it should be used in small amounts to avoid the composite particles becoming partially hydrated and sticky, difficult to handle and unflowable. In one embodiment of the invention, the composite particles are manufactured by coating a core with water and then applying the sealant layer around the coated core. For example, a piece of gravel can be coated with water, and then coated with a sealant material such as activated carbon, bentonite clay, gypsum, or organo clay.

In a preferred embodiment of the invention, a remediation/restoration material is added to the composite particle. This material treats contamination or otherwise restores or improves the surrounding environment through facilitating treatment processes. An all-purpose material can be designed for general use, or the material can be specifically targeted to treat particular contaminants. The need for specifically designed materials is readily apparent in view of the diversity of contaminants and combinations thereof present in the environment, particularly in underwater sediments or landfill sites.

Remediation/restoration materials can include, for example, bacteria designed specifically to treat contamination from solvents, oils or other hydrocarbons. For example, oil-eating bacteria can be added to the binder or sealant layer of the composite particles to clean up contamination of sediments by heavy oil. An enzyme or a fungus may be a particularly desirable material to treat a particular contamination. A preferred composite particle includes clay or gypsum, fertilizer, and a microorganism selected from bacteria, algae and fungi. The fertilizer acts as a host material for the bacteria to feed on in addition to the contaminants.

Other such materials can include neutralizing or oxidizing agents such as ozone, peroxides or permanganates. Remedial chemicals can also be added, such as methoxypolyethylene glycol to treat PCB's. Activated carbon can also be added to remove contaminants.

Another suitable remediation/restoration material is an algae such as in the microbial mats inoculated with algae developed at Clark Atlanta University by Bender and Philips. In these microbial mats, fermented grass clippings are inoculated with blue-green algae. The algae can feed on contaminants on the treated surface as well as the grass, transforming organic contaminants into carbon dioxide.

Besides materials to treat a particular contamination, other materials can be added to the composite particles to restore or improve the surrounding environment, particularly an underwater surface. For example, seeds and/or fertilizer can be added to an underwater surface to promote the growth of grasses and other hydrophytic (wetland) vegetation. A preferred combination of materials to build or rejuvenate a marsh includes seeds, fertilizer, enzymes and bacteria.

The remediation/restoration material is preferably added to the sealant layer of the composite particle. However, it can also be added to or comprise the core of the composite particle so long as the core retains its required density. For example, a remedial chemical or seeds can be added to a degradable core. As another example, the core can comprise a high-density fertilizer.

A bird aversion agent may also be added to the composite particles 10. Suitable bird aversion agents include esters of anthranilic acid, esters of phenylacetic acid, or dimethyl benzyl carbinyl acetate, as examples. Preferred bird aversion agents are dimethyl anthranilate and methyl anthranilate. The bird aversion agent is mixed with the sealant layer or degradable core in amounts sufficient to repel foraging waterfowl which would come into contact therewith.

An animal aversion agent such as capsium may also be added to the composite particles. When the composite particles are used to form a cap over a landfill site, the addition of the animal aversion agent will restrict animals from digging through the cap into the trash.

The composite particle 10 may be provided with an outer coating 13 which aids in keeping the sealant layer 12 intact prior to the deposition of the composite particle on an underwater surface. Preferably, the composite particle is provided with a thin polymeric coating about the sealant layer. Preferred materials for the outer coating are an acrylic resin or a latex. The outer coating should not be of a thickness, dependent upon the particular material, which would prevent the eventual hydration of the sealant layer of the composite particle after it is placed underwater.

The composite particles 10 in accordance with the invention may be formed in any suitable manner. In one embodiment, the binder is placed into an aqueous solution. Enzymes and/or bacteria are preferably mixed into the aqueous binder solution, so that they become intimately mixed with all the other ingredients. The sealant material is mixed into the aqueous solution. If the composite particles include remedial chemicals or other reagents or treatment compounds, they preferably are premixed with the sealant material such as bentonite. A number of the cores 11 are added to this sealant mixture and stirred so that the sealant mixture adheres to each of the cores. The sealant mixture may be allowed to dry about the cores, and then stirred with additional sealant mixture to form a multi-layered sealant layer 12 about each of the cores. The outer coating 13 may then be applied by any suitable means, such as by spraying.

Preferably the composite particles 10 are formed by compressing and compacting the sealant layer against the core. For example, the sealant material and optional binder can be placed into a roller such as a concrete mixer or pugmill. The cores such as pieces of gravel are also placed into the roller. Rotation of the roller causes the cores to become coated with sealant material and to fall and collide against the wall of the roller. This packs the sealant material tightly around the core.

Figure 2:
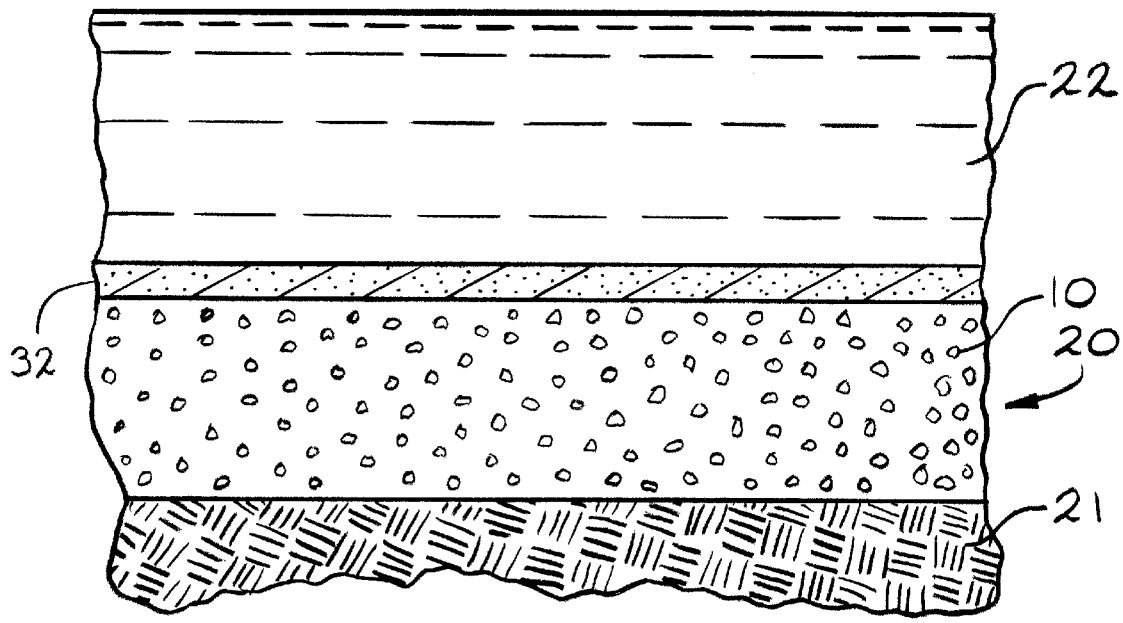
FIG. 2 is a sectional view of the barrier layer formed by a plurality of the composite particles.

An underwater barrier layer 20 formed from the composite particles 10 of this invention is illustrated in FIG. 2. The underwater barrier layer covers a layer of contaminated sediments 21 which lies beneath a body of water 22 characterized as fresh or saline (including brackish)—depending on the water's salinity level. To form this barrier layer, a plurality of the composite particles are deposited on top of the contaminated sediments. If the contaminated sediments are underwater at the time of the deposition, the composite particles may be dropped directly into the water. The composite particles will sink, settling on top of the contaminated sediments. Since the dry composite particles are relatively hard and impact resistant, they may be dropped into the water from the air, such as from a helicopter drop bag. The composite particles may also be pumped out over the contaminated sediments using a conventional pump, with or without a water column present. The composite particles may also be placed from within the water column, through a tremie pipe positioned just above the inundated sediment surface. The composite particles may also be deposited onto the contaminated sediments from a barge or from the shore of a particular surface water body using an articulating telescoping conveyor, a slinger, or a crane equipped with a clamshell bucket. Alternatively, if the climate permits, the composite particles may be deposited when the water above the contaminated sediments is frozen. The composite particles may then be effectively deposited by means of a truck, road grader, low ground pressure bulldozer, or other suitable means. When the ice melts, the composite particles will sink to the bottom, settling on top of the contaminated sediments.

Once the composite particles are submerged, the sealant layer about each of the composite particles begins to absorb water and to swell. The extent of swell depends on the composition of the sealant layer as well as the salinity level within the water. A continuous layer of the sealant layer is thus formed over the top of the sediments, with the cores dispersed randomly throughout. It is believed that the cores aid in keeping the barrier layer intact on top of the contaminated sediments.

A sufficient number and/or thickness of the appropriately formulated composite particles are deposited over an area to form a barrier layer of a hydrated thickness sufficient to minimize the migration of contaminants (either as attached to migrating sediment particles or in dissolved form) into adjacent water resources, including the overlying water column and/or underlying ground water. This can generally be accomplished with a barrier layer of composite particles of a preferred hydrated thickness of between about 3 to about 8 inches, although other thicknesses of hydrated composite particles, ranging from about 1 to about 12 inches, may also be appropriate for some projects. At most sites, the preferred hydrated thickness of composite particles should also be adequate to restrict animals and other organisms using that body of water from coming into contact with the encapsulated sediments, and for minimizing erosion of the underlying, encapsulated sediments. Additionally, one or more layers of composite particles may also be incorporated with other materials (including granular materials like sand, stone and/or cobbles as well as geosynthetic materials like geotextile and/or geogrid) to create a barrier layer which is designed to meet site-specific needs. When incorporated with other materials, the preferred thickness of hydrated composite particles may also range from about 3 to about 8 inches, although other hydrated thicknesses for the composite particle component (perhaps ranging from about 1 to about 12 inches) may also be appropriate. In summary, the most appropriate thickness for a composite particle barrier layer, either when used exclusively or when integrated with other materials, will ultimately depend on a variety of factors, including site-specific conditions, the physical, hydraulic, and/or chemical function(s) that the barrier layer is suppose to fulfill, and overall project goals.

Where a bird aversion agent has been added to the composite particles, it will be dispersed throughout the barrier layer, further discouraging foraging waterfowl from coming into contact with the contaminated sediments beneath the barrier layer.

If desired, additional particulate material such as fibers may also be mixed with the composite particles prior to their deposition on the contaminated sediments. Examples of such materials include recycled plastic, corn cobs, sawdust, recycled paper, carbon fibers and glass fibers. These additional materials help to bind the product together and in some cases may provide an enhanced medium for seed germination and plant growth within the barrier layer.

If a clay mineral is used in the sealant layer 12, a cover layer 23 is preferably provided over the barrier layer 20 to minimize the dissipation of the clay mineral into the water 22, particularly in higher energy environments, thereby effectively increasing the useful life of the barrier layer. Such a cover layer may be formed of a layer of aggregate, such as rocks, gravel or sand, which could also promote the stability of vegetation once established.

Description of Properties of the Composite Particles

The following examples describe laboratory testing conducted or published data compiled to characterize different physical, hydraulic, and chemical properties of the composite particles, and to demonstrate their superior properties. Specifically, information is presented related to: physical characteristics of different composite particle formulations; characteristics of particle settling through standing water columns; hydraulic conductivity of hydrated composite particles; development and function of composite particle barriers; erosion resistance of hydrated composite particle material; contaminant attenuation by hydrated composite particle material; and freeze/thaw effects on hydrated composite particle material.

EXAMPLE 1

The purpose of this set of laboratory tests was to demonstrate general physical characteristics of standard and modified formulations of composite particles, both in terms of characteristics of the bulk (mixed) material as well as characteristics associated with discrete particle size classes of the composite particles.

Large bulk samples of composite particles were prepared in the laboratory using poorly graded #57 gravel together with an organic polymer and varying quantities (weight percentages) of bentonite clay material. The formulations prepared ranged from a bentonite-rich product (70% bentonite plus 30% gravel, referred to as "70BE") to a much leaner formulation (20% bentonite plus 80% gravel, referred to as "20BE"). A total of five different formulations were prepared for testing: 70BE, 50BE, 40BE, 30BE, and 20BE. Selected physical characteristics of composite particles were demonstrated using representative, air-dry samples of these formulations. The physical characteristics determined included: air-dry bulk density and particle size distribution per formulation as well as composition (relative bentonite content), density, and moisture content per discrete particle size classes. Results of previous laboratory characterization studies conducted using another bulk sample of composite particles of standard formulation are also presented for comparison.

Bulk air-dry densities for selected composite particle formulations were determined by weighing bulk masses of particles of known (typically five-gallon) volumes. Particle size distributions for each of the formulations were determined in general conformance with ASTM Method No. D 421. This involved passing representative spit-and-quartered bulk samples of each composite particle formulation through a series of five metal sieves and measuring total particle mass retained on each sieve, as well as particle mass passing through the smallest (#10) sieve.

Moisture content per particle size class was determined on representative subsamples in general conformance with ASTM Method No. D 2216. Following moisture content determination, proportions of clay and gravel comprising each oven-dried particle size class were determined through physically removing clay coatings from gravel cores and weighing respective clay and gravel components. Finally, average air-dry densities of discrete particles were determined by weighing a separate subsample of air-dry particles then determining the volume of water displaced by this mass of particles (to obtain total sample volume).

Testing results are summarized in the following tables. Previous results derived through testing the standard composite particle formulation are also included and are referred to as the "50BE B" formulation.

Typical Air-Dry Bulk Density Values for Different Composite Particle Formulations

| Composite Particle Formulation | Typical Air-Dry Bulk Density (lbs/ft$^3$) |
|---|---|
| 70BE | 78.3 |
| 40BE and 50BE | 76.0 |
| 20BE | 85.8 |

Particle Size Distribution of Composite Particles as a Function of Formulation

Portion of Bulk Sample Within Particle Size Fraction (Weight %)

| Composite Particle Formulation | <0.08 Inch Fraction | 0.08 to 0.19 Inch Fraction | 0.19 to 0.38 Inch Fraction | 0.38 to 0.75 Inch Fraction | 0.75 to 1.00 Inch Fraction | >1.00 Inch Fraction |
|---|---|---|---|---|---|---|
| 70BE | 0.3 | 0.1 | 1.9 | 31.2 | 59.0 | 7.4 |
| 50BE A | 0.6 | 0.3 | 0.8 | 66.2 | 31.7 | 0.4 |
| 50BE B | 0.2 | 0.4 | 9.0 | 65.4 | 25.0 | 0.0 |
| 40BE | 0.3 | 0.3 | 1.3 | 78.5 | 19.5 | 0.1 |
| 30BE | 0.9 | 0.3 | 2.3 | 85.2 | 11.3 | 0.0 |
| 20BE | 0.2 | 0.3 | 1.8 | 83.8 | 13.8 | 0.0 |

Bentonite Content as a Function of Composite Particle Size and Formulation

Portion of Particle Size Class as Hydrated Clay Material (Wt %)

| Composite Particle Formulation | <0.08 Inch Fraction | 0.08 to 0.19 Inch Fraction | 0.19 to 0.38 Inch Fraction | 0.38 to 0.75 Inch Fraction | 0.75 to 1.00 Inch Fraction | >1.00 Inch Fraction |
|---|---|---|---|---|---|---|
| 70BE | 100.0 | 99.4 | 99.7 | 76.4 | 62.1 | 46.1 |
| 50BE A | 100.0 | 42.9 | 81.1 | 52.2 | 36.9 | 27. |
| 50BE B | 100.0 | 69.8 | 67.4 | 52.1 | 44.8 | none |
| 20BE | 100.0 | 35.5 | 33.7 | 20.1 | 11.3 | none |

Moisture Content as a Function of Composite Particle Size and Formulation

Portion of Particle Size Class as Moisture Content (Weight %)

| Composite Particle Formulation | <0.08 Inch Fraction | 0.08 to 0.19 Inch Fraction | 0.19 to 0.38 Inch Fraction | 0.38 to 0.75 Inch Fraction | 0.75 to 1.00 Inch Fraction | >1.00 Inch Fraction |
|---|---|---|---|---|---|---|
| 70BE | 20.0 | 25.0 | 26.1 | 20.3 | 18.0 | 12.2 |
| 50BE A | 22.6 | 22.1 | 21.2 | 14.8 | 10.4 | 7.1 |
| 20BE | 33.3 | 25.0 | 8.0 | 5.9 | 4.0 | 0.0 |

Air-Dry Particle Density as a Function of Composite Particle Size and

Air-Dry Particle Density (grams per cubic centimeter)

| Composite Particle Formulation | <0.08 Inch Fraction | 0.08 to 0.19 Inch Fraction | 0.19 to 0.38 Inch Fraction | 0.38 to 0.75 Inch Fraction | 0.75 to 1.00 Inch Fraction | >1.00 Inch Fraction |
|---|---|---|---|---|---|---|
| 70BE | no data | 1.50 | 1.83 | 1.90 | 1.99 | 2.17 |
| 50BE A | no data | none | 2.01 | 2.21 | 2.14 | none |
| 50BE B | no data | 1.94 | 2.24 | 2.29 | 2.47 | none |
| 20BE | no data | 1.50 | 2.27 | 2.40 | 2.43 | none |

From this Set of Laboratory Tests, it is Concluded That:

Air-dry bulk densities typically range from between approximately 78 to 86 pounds per cubic foot of composite particle material. Values tend to be higher when greater percentages of the composite particle formulation are comprised of gravel, as illustrated with the 20BE sample. Bulk density values also likely change with bulk moisture content, which may vary during the manufacturing process. It is envisioned that other composite particle formulations may display air-dry bulk density values ranging from about 60 to about 100 pounds per cubic foot.

Relatively bentonite-rich composite particles formulations tend to be comprised of larger-diameter particles than are leaner product formulations, as illustrated by differences in the proportion of 1.00–0.75 inch-sized particles for the 70BE and 20BE formulations. This phenomenon is a characteristic of the composite particle manufacturing process. It is envisioned that other composite particle formulations may display a similar relationship between the proportion of sealant layer present in the bulk mix and the particle size distribution of the formulation; for example, a greater percentage of composite particles will occur within the 1.00 to 0.75 inch range for sealant layer-rich formulations than for a less sealant layer-rich formulation of the same composition.

Smaller-diameter composite particles tend to carry higher percentages of clay than larger particles, particularly for bentonite-rich formulations; this is also a characteristic of the composite particle manufacturing process. Differences in clay content amongst smaller fractions of the two standard product formulations (the 50BE A and B mixes) could be due to several factors including slight differences in clay content of the bulk mixture and particle integrity during the sieving process. It is envisioned that other composite particle formulations may display a similar relationship of the proportion of sealant layer present as a function of particle size; for example, smaller-diameter size fractions (e.g., the 0.08 to 0.19 inch size fraction) of a given composite particle formulation will contain proportionally more sealant layer material than will larger-diameter size fractions (e.g., the 0.75 to 1.00 inch size fraction) of the same formulation.

Smaller-diameter composite particles tend to contain higher moisture content than larger particles, particularly for bentonite-rich formulations. This is because the moisture present is associated with the clay component (rather than the gravel component) and smaller particle size fractions have higher clay percentages than larger fractions. It is envisioned that other composite particle formulations may display a similar relationship of moisture content as a function of particle size; for example, smaller-diameter size fractions (e.g., the 0.08 to 0.19 inch size fraction) of a given composite particle formulation will contain proportionally more moisture than will larger-diameter size fractions (e.g., the 0.75 to 1.00 inch size fraction) of the same formulation.

For any formulation, smaller-diameter composite particles tend to be less dense than larger particles; this is because of the presence of higher proportions of relatively less-dense clay and greater porosity related to the clay material. The relationship between particle size and density is accentuated in bentonite-rich formulations in which relatively greater percentages of each particle size are comprised of clay rather than gravel. It is envisioned that other composite particle formulations may display a similar relationship of air-dry particle density as a function of particle size fraction; for example, smaller-diameter size fractions of a given composite particle formulation will display lower air dry particle density values relative to those displayed by larger particle-size fractions. It is also envisioned that other composite particle formulations may display air-dry particle density values ranging from about 1.1 to about 2.8 grams per cubic centimeter, depending on their exact composition and the size fraction in question.

EXAMPLE 2

The physical characteristics of dry, bulk (mixed) composite particle masses as well as discrete particle size classes vary as a function of product formulation (Example 1). Nevertheless, despite differences in physical parameters like bulk density or percent clay content between formulations, bulk samples of composite particles consistently display a broad range of particle sizes as well as predictably variable particle densities amongst the size fractions (Example 1).

The settling velocity of any single particle through a standing (non-flowing) water column depends on the particle's size, density, and shape, and on the water density and viscosity. In general, the settling velocity of a larger particle is higher than that of a smaller particle of the same density and shape; quantitatively, Stoke's law states that, under such conditions, a particle's setting velocity is proportional to the square of its radius. Furthermore, unpublished laboratory research indicates that constant (terminal) settling velocities for individual composite particles of different sizes typically occur within one foot of vertical descent through a standing water column.

In contrast to the relatively predictable settling behavior of individual particles, the settling behavior of bulk (mixed) material masses through water is typically much more complex. Bulk material tends to settle as a single entity rather than as individual particles. As a mass settles, shear stresses and drag forces develop along the settling mass/water interface, resulting in the formation of turbulent eddies within and around the settling mass. A settling mass tends to reach terminal velocity after falling only a short distance; quantification of terminal settling velocities for bulk composite particle masses is the subject of continuing research.

The purpose of this set of laboratory tests was two-fold: (1) to quantitatively demonstrate average settling velocities of individual composite particles of different sizes through small, standing water columns, and (2) to qualitatively demonstrate settling characteristics (relative settling velocities and particle dispersion) of different bulk composite particle masses applied through variable yet large (field-scale) water columns. Data related to the settling characteristics of individual composite particles provide a useful theoretical basis for ultimately characterizing—quantitatively—the settling behavior of bulk particle masses through standing water columns, which is more relevant in terms of actual field applications. In turn, laboratory observations related to settling characteristics of bulk composite particle masses through non-flowing water columns provides baseline information that can be used when modeling composite particle applications to lotic (flowing-water) environments.

Tests Related to the Settling Velocity of Individual Composite Particles:

Ten representative composite particles were chosen from selected particle-size fractions of a sieved, air-dry sample of composite particles of standard formulation (see Example 1). Each particle was dropped through a 31 inch-tall standing column of municipal tap water at room temperature (~70° F.) from just above the water surface and the fall time for each particle was measured with a stop watch to the nearest 0.01 second.

Tests Related to Settling Characteristics of Bulk Composite Particle Masses:

The general settling characteristics of bulk masses of composite particles (standard formulations or similar to) were observed as part of several different large-scale settling-column studies which are discussed in greater detail in Example 6. The studies were conducted using a large (approximately 23-inch×23-inch×12 foot-tall), steel-reinforced Plexiglas settling column. Bulk masses of dry composite particles (ranging in size from approximately 15 to 31 pounds) were applied to standing water columns of different thicknesses (ranging from approximately 4 to 9 feet above the sediment surface); as with individual-particle tests, large water columns were comprised of municipal tap water maintained at room temperature. Each mass of composite particles was applied from just above the water surface by "pouring" the material from a bucket. Relative settling velocities of different-sized particles comprising the bulk mass were qualitatively observed, as was the general nature of dispersion and movement of the settling mass during its decent.

In an effort to more closely mimic the nature of composite particle applications as they occur during actual field applications (e.g. as applied using conveyor systems), the application of composite particle masses to standing water columns in the laboratory was continuous and rapid, but not instantaneous. Product application on a less-than-instantaneous basis, although more representative of field practice, precludes precise quantification of average (and terminal) settling velocities for bulk settling of composite particle masses, as well as a detailed evaluation of how variable mass and/or water-column thickness may quantitatively affect settling behavior. As stated previously, these deployment-related issues are currently the subject of ongoing laboratory research.

The following table summarizes results of average settling velocities of individual composite particles through a small standing water column:

Settling Behavior of Individual Composite Particles
(of Standard Formulation)

| Composite Particle Size Fraction (inches) | Average Settling Velocity (ft/sec) |
| --- | --- |
| 1.00–0.75 | 1.94 |
| 0.75–0.38 | 1.55 |
| 0.38–0.19 | 1.03 |
| 0.19–0.08 | 0.72 |

From This Set of Laboratory Tests, it is Concluded That:

For individual composite particles: Smaller particles comprising standard formulations settle slower through standing (non-flowing) water columns than larger particles. This is because smaller particles have lower densities and higher surface-area-to-mass ratios than larger particles. Differences in average settling velocities as a function of particle size probably also occur for other composite particle formulations, although actual settling-velocity values may differ (due to density differences per particle size class). Based on unpublished research, average settling velocities reported in the above table should approximate terminal, or constant, settling velocities for individual composite particles of standard formulation. It is envisioned that discrete particle size fractions of other composite particle formulations will display average settling velocities ranging from about 0.5 to about 2.0 ft./sec., whether in fresh or saline waters.

For bulk masses of composite particles: Empirical observations made in the laboratory indicate that little to no differences in settling velocities appear to occur as a function of composite particle size when the product is applied as a bulk mass. Instead, the bulk mass tends to behave more-or-less as a single, turbulent and complex entity as it descends through the water column.

When applied as a bulk mass, composite particles tend to disperse during descent through the water column. Results of several different column studies indicate that a greater degree of lateral dispersion tends to occur with greater water-column thickness, and that such dispersion may be constrained somewhat (during laboratory testing) when applying large masses of composite particles through large water columns. Empirical observations also indicate that a greater degree of lateral dispersion of the composite particle mass typically results in a more spatially uniform distribution of particles across the targeted sediment surface.

Due to the apparent viral lack of vertical segregation of composite particle sizes during bulk-mass decent through an approximately 4 to 9-foot water column, product segregation is not observed within the applied composite particle layer, as it occurs across the targeted sediment surface.

It is envisioned that bulk masses of other composite particle formulations will behave similar to those comprising the standard formulation, with respect to general settling characteristics and dispersion during descent, whether in fresh or saline water.

EXAMPLE 3

According to regulatory guidance published by the United States Environmental Protection Agency (US EPA), one principal function of an in-situ remedial sediment cap at most sites should be to reduce the flux, or movement, of dissolved contaminants from contaminated sediments into the overlying water column. Contaminants can typically move from sediments into water, or into underlying ground water resources, through advective as well as diffusive processes. Advection generally refers to the movement of bulk porewaters, the ultimate rate and extent of which is largely a function of local hydraulic gradients and a saturated substrate's hydraulic conductivity (or permeability); advective movement of contaminants, therefore, involves contaminant movement by "mechanical" or non-chemical means, i.e. as part of bulk water flow. In contrast, diffusion, or diffusive contaminant movement, is the process whereby contaminants dissolved in water are transported by random molecular motion from areas of high concentration to areas of low concentration. The rate and extent of contaminant movement through a saturated substrate by diffusion is typically controlled primarily by concentration gradients, however, contaminant attenuation by—or sorption to—reactive particle surfaces can greatly reduce their overall movement. Published data which implies the chemical-attenuating abilities of hydrated composite particles are presented and discussed in Example 7 whereas the flow of freshwater through hydrated composite particles under saturated conditions is the focus of the current example.

The purpose of this set of laboratory tests was to characterize the hydraulic conductivity of hydrated samples of different composite particle formulations for freshwater flow, as determined under saturated conditions and using standard testing procedures.

Representative samples of three different composite particle formulations, including 50BE, 40BE, and 20BE, were used to determine saturated hydraulic conductivity, in general conformance with ASTM Method No. D 5084; typical physical and compositional characteristics for this range of composite particle formulations are provided in Example 1. One subsample for each of the 50BE and 40BE formulations was tested whereas four subsamples of the much leaner 20BE formulation were tested in order to more accurately determine the degree of analytical variability for this laboratory method.

Laboratory procedures involved placing appropriate and representative masses of dry composite particles into flexible-wall permeameters and thoroughly hydrating the samples with de-aired fresh (municipal tap) water under pressure to assure that samples were completely saturated prior to permeability testing. The pre-saturation process typically took from one to two weeks, until samples stopped taking in water from both ends. After sample saturation, the hydraulic conductivity test was run under constant hydraulic gradients ranging from approximately 17 to 19 cm/cm for 20BE samples and from 26 to 28 cm/cm for 40BE and 50BE samples; according to ASTM Method No. D 5084, hydraulic conductivity values are presumably unaffected by variable hydraulic gradients—testing values of which were below the recommended maximum (30 cm/cm) for testing low-permeability (less than $10^{-7}$ cm/sec) materials.

Test results are summarized in the following table:

Hydraulic Conductivity of Different Composite Particle Formulations

| Composite Particle Formulation | Hydraulic Conductivity Values (cm/sec) |
|---|---|
| 50BE | $5.93 \times 10^{-9}$ |
| 40BE | $3.94 \times 10^{-9}$ |
| 20BE | Arithmetic Mean = $4.59 \times 10^{-9}$ |
|  | Geometric Mean = $4.52 \times 10^{-9}$ |

From This Set of Laboratory Tests, it is Concluded That:

Hydrated and saturated masses of the tested composite particles are highly impervious to advective flow of freshwater, with measured values on the order of what would typically be expected for hydrated bentonite in pure form.

Similarly low hydraulic conductivity values observed for the more lean 20BE composite particle formulation and relatively bentonite-rich 40BE and 50BE formulations implies that the presence of significant quantities of aggregate within the hydrated composite-particle matrix has an insignificant effect on product performance as an effective hydraulic barrier.

The data also indicate that consistently low permeability values for composite particles can be achieved through controlled laboratory testing, which is testament to both the reproducibility of the testing procedure used as well as the inherently impervious nature of the bentonite component of the composite particles.

It is envisioned that the laboratory scale hydraulic conductivity values corresponding to other composite particle formulations for fresh or brackish percolating liquids may be similar to those reported above for relatively bentonite-rich formulations (i.e., on the order of $1 \times 10^{-9}$ cm/sec or less). However, conductivity values may also be relatively greater (i.e., greater than $1 \times 10^{-9}$ cm/sec or less), depending on the specific composition of the composite particle formulation, and depending on the salinity level of the percolating liquid.

EXAMPLE 4

Results of bench-scale, hydraulic conductivity testing of composite particles indicate that, under controlled laboratory conditions and using standard ASTM testing procedures, hydrated and saturated composite particle masses display very low hydraulic conductivity values for freshwater flow, on the order of about $4 \times 10^{-9}$ cm/sec or lower (see Example 3). The highly impervious nature of hydrated and saturated composite particle masses during freshwater flow contributes to the material's ability to minimize the flux or movement of sediment-borne contaminants into adjacent surface- or ground-water bodies through minimizing advective pore-water flow. As also described in Example 3, contaminant flux reduction is considered to be an important function of in-situ remedial sediment caps.

The purpose of this set of laboratory tests was to determine the hydraulic conductivity of hydrated composite particle masses during freshwater flow, as determined on a large (field-equivalent) scale using a recognized and accepted procedure developed for evaluating the efficiency of clay based landfill caps and liners.

Field-scale hydraulic conductivity (also referred to as permeability) of hydrated composite particle masses was determined using the Two-Stage Borehole Field Permeability Test developed by Soil Testing Engineers, Inc.—a procedure also commonly $mown as the Boutwell Test. The Boutwell Test is a standardized field procedure used for quantitatively evaluating the flow of rainfall through clay based landfill caps, or leachate through constructed liner systems. The Boutwell Test is widely recognized and accepted by the US EPA, the US Army Corps of Engineers (USACE), and many state regulatory agencies.

In theory, the Boutwell Test is based on the concept that when the three-dimensional geometry of a substrate's wetted zone is varied systematically, the vertical and horizontal permeabilities also vary in a calculable manner. That is, during "Stage I" of this permeability test, the bottom of a test hole augured into a substrate is positioned flush with the bottom of the cased (and water-filled) hole, allowing for primarily vertical flow from the casing into the substrate. In contrast, "Stage II" of the test subsequently involves advancing the test hole several inches beyond the bottom of the water-filled casing, thus allowing for significant horizontal flow through the substrate.

The Boutwell Test has associated with it a number of boundary condition requirements that must be met in order for the test to be considered valid. Such requirements range from a minimal thickness of material below the bottom of the test hole during Stage II (8 inches) to a minimum horizontal distance between test holes (20 inches). Personal communication with Dr. Gordon Boutwell confirmed that these and other requisite assumptions and conditions were met through conducting testing of hydrated composite particle masses, as described herein.

The Boutwell Test was performed out-of-doors in two large (1000-gallon capacity) plastic testing vessels, each equipped with valving and drainage along perimeter sides and bases to allow for gravity drainage from each vessel (in order to meet boundary condition requirements).

Quantities of composite particles, similar in composition to the 40BE formulation (see Example 1), were added incrementally in 4- to 6-inch lifts and hydrated through the addition of municipal tap water; approximately one-day hydration time occurred between each lift. The final, cumulative thickness of the hydrated composite particle mass contained in each vessel was approximately 3.5 feet. At this point, the filled vessels were ready for installation of the testing devices.

A total of seven permeameters and one TEG (temperature effect gauge) unit were installed in the hydrated composite particle masses, to total depths of about twenty inches below the material surface. A hand auger was used to drill the 4.5-inch diameter holes to the required depth, into which each test device was then installed.

Permeability testing involved collecting data in two different stages, as described above: Stage I of the test, during which vertical permeability has the greatest affect, was conducted over a period of sixteen days. Once the permeability values for Stage I had apparently stabilized (which took approximately two weeks), Stage II was conducted over a period of ten days. Visual and manual inspection of hydrated (but pre-tested) composite particle masses removed from augured test holes indicated that the bentonite-rich material may not have been fully hydrated during the initial portion of Stage I monitoring.

Testing results are summarized in the following table; for comparison, see Example 3 for typical bench-scale, hydraulic conductivity values.

Calculated Vertical and Horizontal Permeability of Freshwater Through Hydrated Composite Particle Masses (n=7 samples).

| Calculated Vertical Permeability[1] | | | Calculated Horizontal Permeability[1] | | |
|---|---|---|---|---|---|
| | | M1 Values in Units of cm/sec | | | |
| Value Range | Arithmetic Mean | Geometric Mean | Value Range | Arithmetic Mean | Geometric Mean |
| $5.70 \times 10^{-9}$ to $1.12 \times 10^{-8}$ | $8.65 \times 10^{-9}$ | $8.41 \times 10^{-9}$ | $2.84 \times 10^{-8}$ to $3.96 \times 10^{-8}$ | $3.26 \times 10^{-8}$ | $3.23 \times 10^{-8}$ |

[1]Variability (standard deviation) amongst replicates for the respective calculated values was less than 18 percent.

Calculated mean permeability values for vertical and horizontal flow of freshwater through hydrated composite particle masses on a field scale are quite low, on the order of $10^{-8}$ to $10^{-9}$ cm/sec; if, in fact, the particle masses had been fully hydrated during Stage I, the actual vertical component would likely have been lower. Additionally, the permeability of hydrated composite particle masses observed on a field scale is comparable to values determined on a benchtop scale for different product formulations (Example 3).

From This Set of Laboratory Tests, it is Concluded That:

Composite particles—once in place and hydrated on a field scale—not only form an effective physical barrier between a contaminated substrate and the adjacent environment, but also an effective hydraulic barrier between such ecosystem components as well. Whether considering a landfill, deepwater, or wetland application scenario, such characteristically low permeability would help protect against upward migration of contaminated sediment pore waters into an overlying water column, or the downward migration of dissolved contaminants into underlying ground water resources.

It is envisioned that the hydraulic conductivity values determined on a large (field equivalent) scale for other composite particle formulations and for fresh or brackish percolating liquids may be similar to those reported above for relatively bentonite-rich formulations (i.e., on the order of $1 \times 10^{-9}$ cm/sec or greater). However, conductivity values may also be relatively less (i.e., greater than $1 \times 10^{-9}$ cm/sec), depending on the specific composition of the composite particle formulation, and depending on the salinity level of the percolating liquid.

EXAMPLE 5

According to guidance published by the US EPA, one principal function of an in-situ remedial sediment cap at most sites—in addition to reducing contaminant movement, as discussed in Example 3—should be to stabilize contaminated sediments, minimizing their re-suspension and subsequent transport to other (e.g. downstream) locations. Installation and maintenance-in-place of remedial sediment caps that withstand significant water-related erosional forces associated with hydrologically dynamic systems (like rivers or estuaries) will minimize exposure, redistribution, and dispersion of the sediments being encapsulated.

The purpose of this set of laboratory tests was to demonstrate the relative physical resistance of hydrated composite particles of standard formulation (see Example 1) and other, less cohesive materials to significant, fluvial-like erosive (scour) forces of known velocity and duration for freshwater flow.

The physical resistance of a variety of saturated composite particle, fine-grained sediment, and sand samples has been characterized in the laboratory using a large-scale circulating flume system. This flume system is comprised of a 7.5-foot long×4 inch-internal-diameter, clear PVC sample chamber, a pump, and a holding tank that supplies and receives flow to and from the sample chamber. The sample chamber, into which a test sample is placed, is connected to the rest of the flume system through flexible hosing and threaded unions.

Depending on project needs, specific parameters and procedures for flume testing of samples can vary somewhat with respect to induced flow velocities, flow duration, sample size or configuration, pre-test hydration periods, etc. Nevertheless, the general procedure typically followed during testing is as follows: first, a pre-weighed test sample (e.g. composite particles, saturated sediment or sand, or composite particles over sediment) is placed into the clear, semi-circular, two-foot-long×1.5-inch high acrylic sample holder; samples are typically placed into the holder to result in a surface that is usually about 0.4 to 0.8 inches above the top edge of the holder, thus placing a portion of the sample directly into the water's flow path.

The sample is then carefully inserted into the sample chamber. Flat and sloped spacer sections are then placed into the flume chamber—at both "upstream" and "downstream" ends of the sample holder—to establish more uniform flow over the top of the test sample.

Once the flume chamber is closed and secured, water (which could be either fresh or saline depending on project requirements) is then pumped across the sample surface at controllable flow velocities (as manipulated through the use of in-line valves). The system configuration allows for establishing and periodically checking flow velocities by diverting flume-chamber discharge from the holding tank into a volume-calibrated drum and measuring the time required to pass a specific water volume across the test sample. Flow velocities over the top of a given sample, in units of feet per second (ft/sec), can then be calculated using bulk-flow measurements together with estimates of the cross-sectional surface area over the top of the sample being tested. Flow velocities are referred to in terms of approximate ranges because cross-sectional areas can vary along sample length (due to variable surface topography) and over time as well (due to continued clay hydration and/or erosional losses).

After testing, a sample can then be removed from the chamber and re-weighed to determine product loss through erosion. The physical response of samples during and/or after testing can be evaluated in various ways, including: visual observation and video documentation, pre-versus post-testing weight comparisons, and/or estimating clay mass loss based on typical, pre-test composite particle compositions.

Results of multiple flume tests conducted using freshwater indicate that insignificant erosional losses occur from the surface of hydrated composite particle masses at flow velocities as high as 5 to 6 ft/sec, and for continuous flow durations of as long as several days.

In contrast to the observed relative resistance of hydrated composite particle masses under high flow conditions, erodability is typically high for saturated sand and unconsolidated, fine-grained sediments at flow velocities of approximately 2 ft/sec or less, and for flow periods of as short as 10 to 20 minutes; such unconsolidated saturated materials can display 90 percent-plus mass loss under these relatively passive flow conditions.

From This Set of Laboratory Tests, it is Concluded That:

Hydrated composite particle masses are relatively resistant to significant, and sustained, fluvial-like erosive forces during freshwater flow. As a result, sediments occurring in lotic (flowing-water) environments and overlain by composite particle-based capping systems should remain in place and physically stabilized during relatively high-flow events. In contrast, other materials such as less-cohesive sediments and saturated sands prove to be significantly less resistant to hydrologic erosive forces. Depending on a site's hydrologic/hydraulic conditions, capping of sediments with less scour-resistant materials may not offer the same degree of sediment stabilization as would capping with composite particles, or would require excessive thicknesses of relatively less resistant capping material that could interfere with waterway navigation.

It is envisioned that other composite particle formulations may display similarly high erosion resistance to flowing fresh and/or saline waters relative to that displayed by non-cohesive sands, sediments, and gravel. Specifically, it is envisioned that other composite particle formulations may display significant erosion resistance to fresh and/or saline waters flowing at velocities ranging from about 1 to about 6 ft/sec (with "resistance" determined by visual observation and video documentation, pre- versus post-testing weight comparisons, and/or estimating clay mass loss based on typical, pre-test composite particle compositions) relative to that erosion resistance displayed by non-cohesive sands, sediments, and gravel under the same flow conditions and using the same water type.

EXAMPLE 6

Two principal functions of in-situ remedial sediment caps, according to recommendations from the US EPA, should be to reduce the flux or movement of dissolved sediment-borne contaminants into the overlying water column and to physically stabilize contaminated sediments, minimizing their re-suspension and subsequent transport to other sites. The ability of hydrated composite particle masses in reducing the advective or "mechanical" flux of contaminant-bearing pore waters into adjacent water resources is described in Examples 3 and 4, whereas its ability to attenuate dissolved contaminants, thereby reducing contaminant movement by diffusion processes, is described in Example 7. The marked physical resistance of hydrated composite particle masses to substantial hydrologic erosive forces, thus resulting in stabilization of the underlying, capped sediments, is described in Example 5.

A third typically recommended function of remedial sediment caps—isolation of contaminated sediments and associated contaminants from the habitat of benthic invertebrate organisms—can also be fulfilled by sediment caps constructed of composite particle material. Most sediment-dwelling benthic organisms typically occur within the upper several inches of sediment, although other factors (e.g. dissolved oxygen levels, contaminant concentrations, etc.) also control depths of organism burrowing (or bioturbation). The thickness for typical composite particle-based sediment cap designs (on the order of 4 to 8 inches) should more than encompass maximum depths for bioturbation for most organisms, although this would typically require assessment on a site-by-site basis.

Additionally, the potential for natural deposition of relatively clean sediments over the top of composite particle-based caps over time would further isolate the benthic environment from contaminated sediments to an even greater degree. Hydrated composite particle masses can also offer a physically similar, and clean, substrate for the colonization of indigenous burrowing invertebrates, over and above simply isolating the organisms from contaminated sediments.

In order for the composite particle technology to effectively meet the functions described above within large-scale laboratory or in-field settings, development of a laterally continuous cap immediately above the sediment/water interface is essential for most project applications. The behavior of individual composite particles as well as bulk product masses during application and descent through standing water columns is described in Example 2. The current example describes typical sediment responses to particle applications (once the material impacts the water/sediment interface) as well as the subsequent development and characteristics of hydrated composite particle-based caps.

The purpose for this set of laboratory tests, conducted exclusively with fresh water, was four-fold: (1) to demonstrate cap development and properties as a function of composite particle formulation, on a relatively small scale and without an underlying sediment component present; (2) to demonstrate typical sediment responses to bulk composite particle applications on a large scale; (3) to demonstrate the nature of cap development over the top of sediments over time; and (4) to demonstrate the degree of physical as well as hydraulic isolation of sediments achieved by composite particle caps on a large scale.

Numerous laboratory studies characterizing water and sediment responses to composite particle applications and subsequent cap development have been conducted, at different column scales and using different formulations, sediment types, water-column thicknesses, and/or rates of particle mass application.

Some cap-development studies have involved the use of small, four-inch-diameter by two to three-foot tall acrylic columns; small-column studies have been conducted with and without sediment components present beneath the developed cap. Other column studies have involved the use of a much larger (approximately 23-inch×23-inch×12 foot-tall) steel-reinforced Plexiglas settling column. This field-scale settling column is equipped with a gravity drainage system that allows for monitoring vertical water flow through the column. Using this apparatus, the behavior of water-column, sediment, and capping components—including the hydraulic behavior of the sediment and/or cap-plus-sediment components—can be observed at vertical dimensions comparable to those of the deepwater or wetland ecosystems being modeled. Clear column sides facilitate visual observation and subsequent quantification of water-, cap-, and sediment-related phenomena.

Procedures for column preparation, prior to composite particle additions, typically include the following elements: placement of the desired sediment type and thickness (up to three feet) into the column; addition of the desired thickness (and type) of water over the top of the sediments, up to 8 or 9 feet; allowing for water clarification and sediment stabilization through self-consolidation beneath the applied water column; and determination of pre-cap flow through the sediment, with or without manipulations to the water height (head), as desired.

Procedures for column operation and data collection during and after composite particle addition typically include observation and documentation of the following items: descent of the bulk particle mass and dispersion through the water column; the degree and uniformity of sediment-surface coverage, sediment penetration and sediment re-suspension upon particle impact with and settlement into the sediment; the rate and extent of composite particle hydration, cap formation, and net vertical expansion of the cap over time; and ultimately, the degree of sediment isolation, including post-cap flow measurements to determine the degree of hydraulic isolation produced by the developed cap.

Cap development and properties as a function of composite particle formulation: Test results indicate that the rate and net vertical extent of cap expansion (thickness) varies depending on a number of factors including: the type of sediment being capped, particle application rate, and particle formulation. An example of the effect of composite particle formulation on cap thickness and other physical cap properties is illustrated in the following table:

| Composite-Particle Formulation | Hydrated Cap Thickness Range (inches) | Net Vertical Expansion (% initial) | Average Wet Bulk Density (g/cc) | Average Moisture Content (% Dry Weight) |
|---|---|---|---|---|
| 70BE (70% clay) | 4.0–5.3 | 233–354 | 1.23 | 175.3 |
| 50BE (50% clay) | 3.7–5.2 | 219–340 | 1.32 | 170.7 |
| 20BE (20% clay) | 2.5–3.6 | 135–213 | 1.53 | 88.9 |

Descriptions and dry form physical characteristics of the above composite i5 particle formulations are described in Example 1. The tabled data were derived through using replicate four-inch, fresh-water-filled acrylic columns and a bulk composite particle application rate of approximately 10 pounds per square foot to each column (n=4 for each formulation). To simulate field conditions as closely as possible, column design allowed for product hydration from below as well as above the capping layer, over time periods of 25 to 27 days.

Sediment response to composite particle applications: Varying degrees of sediment re-suspension can occur during particle impact with the sediment surface, depending primarily on sediment texture and particle application rates; suspended sediments re-deposited onto the hydrating composite-particle mass are effectively encased within the fully hydrated cap. Results of additional laboratory studies indicate that, if required, re-suspension can be greatly reduced during particle deployment by first placing a thin sand layer over the top of the targeted sediment prior to application of composite particles.

Minimal sediment penetration and settlement typically occurs during and after bulk particle application through 4 to 9 foot water columns, even when applying particle masses to relatively soft and fine-grained (penetration-sensitive) sediments. Minimal particle intrusion into the sediment surface insures that the cap will develop effectively, over the top of the targeted sediment instead of within the sediment mass.

Development of a hydrated composite particle cap: Typically within seven to ten days of application, the layer of initially discrete composite particles hydrates and expands both laterally and vertically, coalescing into a continuous and cohesive cap over the top of the sediments.

Physical and hydraulic isolation of sediment by hydrated composite particle caps: Physical isolation of contaminated sediments from the overlying water column is effectively achieved through the formation of a laterally continuous and cohesive, hydrated composite particle layer over the top of the sediments. As illustrated in the above table, hydrated cap thicknesses will depend on a variety of factors, including the particular formulation used for cap construction.

Relative hydraulic isolation of contaminated sediments from the overlying water column is also achieved through capping. Post-capping water flow through an approximately three foot-thick sediment column and out the base of the column structure (approximately $3 \times 10^{-7}$ cm/sec) is significantly reduced relative to pre-capping flow rates through the column (which were approximately $3 \times 10^{-6}$ cm/sec). Further evidence of hydraulic isolation during one particular column study was the formation of large, air-filled voids immediately beneath the cap/sediment interface, with a 4-foot water column still positioned over the top of the cap.

From This Set of Laboratory Tests, it is Concluded That:

Composite particles can form a continuous and cohesive physical, hydraulic, and biologic barrier over the top of contaminated sediments, thereby protecting overlying deep-water or wetland ecosystems and their inhabitants.

It is also envisioned that other composite particle formulations may display characteristics similar to those displayed by relatively bentonite-rich formulations with respect to the following characteristics, and regardless of whether the composite particles are added to fresh or saline water columns:

(1) with respect to sediment response to composite particle applications—using other formulations of composite particles, varying degrees of sediment re-suspension may be observed upon particle impact with the sediment surface; sediments re-deposited onto the hydrating composite-particle mass may be effectively encased within the fully hydrated cap; placement of a thin layer of sand or other material over the sediment prior to particle additions may significantly reduce sediment re-suspension upon particle impact; and minimal penetration and settling of the particles may occur into the sediment surface;

(2) with respect to development of a hydrated composite particle cap—using other formulations of composite particles, a layer of initially discrete composite particles may hydrate and expand, both laterally and vertically, coalescing into a continuous and cohesive cap over the top of the sediments; net vertical expansion may range from about 100 to about 350 percent; average wet bulk density may range from about 1.1 to about 1.7 grams per cubic centimeter; and average moisture content may range from about 80 to about 200 percent; and (3) with respect to physical and hydraulic isolation of sediment by hydrated composite particle caps—using other formulations of composite particles, physical isolation of contaminated sediments from the overlying water column may be effectively achieved through the formation of a laterally continuous and cohesive, hydrated composite particle layer formed over the top of the sediments; and hydraulic isolation of the contaminated sediments from the overlying water column (and from underlying ground water) may be achieved, in that a measurable decrease in vertical flow (of up to one order of magnitude or more) may be observed in capped versus pre-capped environments.

EXAMPLE 7

Clay minerals are natural and essentially inert materials with physical and chemical properties that are well understood. They have long been used in the environmental industry to contain or isolate various hazardous substances, primarily because of their relatively low permeability to aqueous solutions. In particular, bentonite, which is a geologic deposit rich in smectite clays, has been used extensively as an integral component of drilling fluids, in landfill liner and capping systems, and in slurry walls for diverting ground water flow. Bentonite is a principle component of typical formulations of the composite particle technology (see Example 1) and not only has substantial merit as a hydraulic barrier (see Examples 3 and 4), but also as a chemical barrier as well.

Because of its mineralogical and surface-charge configuration, montmorillonite—typically the major component of bentonite—has an inherently large surface area compared to other commonly occurring phyllosilicate, or "plate-like", clay minerals, as shown in the table below. This high surface area, in combination with water's affinity for the surfaces of montmorillonite particles (which are negatively charged), results in significant physical expansion of the clay upon its hydration (see Example 6). The high surface area and negatively charged surfaces also account for the clay's ability to sorb, and exchange, relatively large quantities of dissolved cations.

Typical Physical and Chemical Properties of Montmorillonite and Other Selected Phyllosilicate Minerals

| Clay Type | Surface Area ($m^2/g$) | Expands Upon Hydration? | Cation Exchange Capacity (meq/100 g) |
| --- | --- | --- | --- |
| Montmorillonite | 600–800 | Yes | 80–120 |
| Mica | 20–40 | No | 70–120 |
| Kaolinite | 10–20 | No | 1–10 |

A survey of published research indicates that naturally occurring montmorillonite and bentonite can not only sorb relatively innocuous, base-metal cations like calcium, magnesium, and sodium, but can also strongly sorb—or attenuate—potentially toxic heavy metal cations onto clay surfaces, effectively keeping such metals out of the bulk solution phase of subterranean pore waters and surface waters. Results of batch-shaking and flow-through column studies (published by others) typically indicate significant removal of dissolved heavy metal cations like lead, copper, zinc, cadmium, and nickel from solution onto montmorillonite and bentonite substrates, as shown in the following table:

Heavy Metal Sorption from Solution onto Montmorillonite and Bentonite Bentonite Montmorillonite

| Heavy Metal | Bentonite (initial solution pH = 5) Percent of Metal Removed from Solution | Montmorillonite (pH between~4 and 7) |
| --- | --- | --- |
| Lead | 82 | 20–100 |
| Copper | 56 | 20–100 |
| Zinc | 34 | 20–40 |
| Cadmium | 71 | 15–20 |
| Nickel | No data available | 15–20 |

The degree of metal attenuation by montmorillonite and bentonite differs amongst metal species (primarily according to charge and ionic radius) and also varies as a function of numerous system variables including: pH, competition between metals for exchange or sorption sites, total salt concentrations in solution, oxidation-reduction potential, the presence of dissolved organic substances, and speciation of metal ions in solution. For example, lead and copper typically sorb more strongly to most clay mineral surfaces, including montmorillonite, than do zinc and cadmium, and metal sorption is typically greater overall in higher-pH systems (such as bentonite-rich substrates). Published research also generally indicates that, despite such systematic factors affecting ion sorption, heavy metal cations are typically held more strongly to montmorillonite and bentonite than are mono- and most divalent base-metal cations. Additionally, a greater degree of metal sorption occurs to montmorillonite, on a per-gram basis, than to other lower surface-area clays like kaolinite and illite. In many situations, inorganic oxides of iron, manganese, and aluminum—when present—can accentuate heavy metal sorption to clay rich substrates.

In light of demonstrated abilities for metal sorption or attenuation under controlled laboratory conditions, montmorillonite and bentonite have both been used in different capacities within the environmental industry for the purposes of immobilizing heavy metals in contaminated soils and sediments, removing metals from landfill leachates, and removing metals from waters and wastewaters. Due to its low permeability and radionuclide-sorbing capabilities, bentonite is also commonly considered for use as an environmental buffer during subterranean disposal of low- to high-level radioactive wastes. Such remedial uses of these clay and clay rich materials will likely continue, and increase, as should development and use of chemically modified versions of montmorillonite and bentonite clays for selective sorption or attenuation of organic pollutants.

Specially engineered cation-like compounds, generally referred to as quaternary ammonium ions, can be used to physically displace base cations, like sodium, from exchange sites of montmorillonite clays; the use of tetramethylammonium ions is one example.

The reactive surfaces of these newly formed organoclays or organobentonites are more organophilic in nature (compared to non-modified clays) and, as a result, have a greater affinity for charged or non-charged organic pollutants, like benzene. Published laboratory research indicates that these organoclays can selectively remove a variety of organic pollutants (petroleum products, solvents, and pesticides) including non-polar, nonionic BTEX compounds (benzene, toluene, ethylbenzene, and xylenes), phenols and chlorinated hydrocarbons (e.g. pentachlorophenol and 1,2, 4-trichlorobenzene), and pesticides like oxamyl and phosphamidon. As with metal-clay interactions, the degree of organic-pollutant attenuation by organoclays is also dependent on factors like system pH and competition for clay sorption sites. Organoclays have been used commercially in water and wastewater treatment systems for the removal of various low- and high-molecular-weight organic pollutants from contaminated ground waters and industrial waste streams (including oils and greases). Organoclays have also been tested for use in the solidification/stabilization of phenolic-contaminated soils.

The bentonite component of typical composite particle formulations, either in its natural or modified form, can effectively remove heavy metals and/or organic pollutants from the bulk solution phase. However, other types of clay minerals or clay sized materials—such as inorganic oxides and humic substances—can also be used in conjunction with, or instead of, bentonite to develop special composite particle formulations designed to address site-specific needs, including sediment isolation in saline (including brackish) aquatic environments.

In summary, hydrated composite particle masses can keep toxic, harmful compounds from migrating into ground water, or from becoming exposed to sensitive floral or faunal communities inhabiting overlying deepwater or wetland ecosystems. The inherently low permeability of hydrated composite particles further accentuates its ability to effectively isolate pollutants from such sensitive environments. Therefore, a cap formed by composite particle material of a variety of formulations can not only act as an erosion-resistant, physical and hydraulic barrier between contaminated sediments and surface or subsurface water resources, but can also be mineralogically and compositionally tailored to maximize chemical sorption or attenuation of specific metal or organic pollutants, depending on site-specific conditions and project needs.

EXAMPLE 8

For some ecosystems, including seasonally exposed wetlands occurring in northern regions, the potential exists for periodic exposure of substrates to climatically induced, freeze/thaw effects. The effects of cyclic freeze/thaw on the physical structure and hydro-conductive properties of different clay mineral-based capping and lining materials have been investigated both in the laboratory and field. Results of these studies generally indicate that while the physical structure and hydraulic conductivity of many compacted clay materials can be adversely affected by freeze/thaw processes, the same properties of geosynthetic clay liners, or GCLs, are typically not affected. The marked resilience, or "healing" abilities, of GCLs relative to many compacted clays is largely attributable to the significant bentonite component in GCLs; bentonite is a principle component of typical composite particle formulations.

The purpose for this set of laboratory tests was to qualitatively demonstrate effects of cyclic freeze/thaw on the physical appearance of masses of hydrated composite particles.

Five masses (samples) of hydrated bentonite-rich composite particles were prepared in four-inch square, clear-plastic containers. These containers were selected to allow for observation of freeze/thaw effects, and to minimize confining pressure on the samples. 500 mls of municipal tap water and a 2-inch thick layer of dry composite particles were added to each container. The particles were hydrated by periodically adding water to achieve complete saturation. The volume of each sample approximately doubled through hydration and expansion, with total hydrated volumes ranging from approximately 1,100 to 1,200 mls. Each sample was then subjected to a total of five freeze/thaw cycles and the physical condition of the samples after each cycle was observed and recorded.

Test results indicated that each freezing event produced discrete, open fractures (less than about 1/8-inch in width) which contained free water that probably migrated from water on top of the sample; none of the observed fractures penetrated entire sample thicknesses. The positions and orientations of these freezing fractures were noted by tracing them with a marker on the clear plastic containers. Upon thawing of each sample, all fractures completely closed, or "healed", creating physical conditions apparently equivalent to pre-freezing conditions.

Subsequent freezing events produced new fractures of different position and orientation, implying that definitive (and enduring) planes of weakness do not form in the hydrated product. Again, these newly formed fractures healed upon thawing of the samples. Additionally, no fractures persisted from one freeze/thaw cycle to the next.

From This Set of Laboratory Tests, it is Concluded That:

Freezing of hydrated composite particle masses produces discrete, open fractures, however, the fractures do not penetrate the total sample thickness.

Freeze-induced fractures heal, and the mass of hydrated composite particles returns to its original, physically homogeneous state upon thawing.

It is envisioned that hydrated masses of other composite particle formulations, which may contain other materials within the sealant layer in addition to bentonite, may also display an ability to re-heal fractures related to cyclic freeze/thaw effects, when the material occurs in fresh or saline environments.

Description of Techniques for Applying the Composite Particles

Examples of techniques for applying, or spreading, adequate masses or thicknesses of appropriately formulated composite particles or other flowable, solid or semi-solid materials like stone (collectively referred to as "materials") across targeted, subaerial locations or across subaqeous (inundated) surfaces in freshwater or saline (including brackish) aquatic (deepwater or wetland) environments in order to affect substrate isolation or other functions include: (1) an articulated, telescoping conveyor, which can be operated from barge- or on-shore positions; (2) a helicopter, equipped with specially designed drop bags; and (3) a clamshell bucket attached to a crane, which can be operated from barge- or on-shore positions.

The use of conveyor, helicopter, and crane/clamshell systems for application of composite particles and/or stone has been successfully demonstrated within the context of pilot-scale field studies conducted in wetland and/or deep-water (riverine) aquatic environments. Although not yet pilot tested for material applications, other existing equipment or technologies—including dry land, slinging, or pumping methods—can also be used to apply materials across targeted subaerial locations or subaqeous surfaces in freshwater or saline aquatic environments.

The use of one or more of these application techniques at a given site will depend on a variety of factors including: site and shoreline access, size of the application area, hydrologic characteristics (e.g. water depth and continuity of the surface water body), cost, and other factors related to site-specific conditions and project goals.

EXAMPLE 9

Materials can be applied across subaqeous surfaces of freshwater or saline aquatic environments (and across adjacent subaerial locations) using an articulated, telescoping conveyor operated from a barge.

Prior to application using this technique, and to assure uniform material applications, colored floats can be placed across the water surface to establish target application areas. The size of each target area is typically determined by conveyor hopper load capacity and appropriate material application rate(s), which are typically determined beforehand through controlled laboratory testing. Prior to field applications, parameters for conveyor operation—including belt speeds and conveyor-boom height—can first be established and optimized at a test site.

To accomplish material applications in the field using this technique, material can be transferred from shore to the barge-based conveyor using a rockbox mounted onto a smaller barge. A crane with a clamshell bucket can be used to load the rockbox from a nearby material stockpile, with the size of each rockbox load estimated by measuring water displacement during loading. Once loaded, a workboat crew can transfer the full rockbox to the conveyor on the barge, and a barge-based backhoe can transfer the material into the conveyor hopper.

The material can then be fed from the hopper onto a series of conveyor belts. Belt speeds and conveyor-boom positions can be remote-controlled by the barge-based operator. Based on results of pilot field tests, approximately 8 to 9 tons of either composite particles or stone can be placed over a designated target area in about 10 to 12 minutes of continuous conveyor operation. Quality control (QC) procedures, involving direct communications between a shore-based QC technician and the conveyor operator, can be implemented to insure adequate and uniform application of material across targeted areas.

After covering all of the inundated area that could be reached from a particular location with the nearly 100-foot long telescoping and articulating conveyor, the host barge can then be re-positioned to facilitate continued application in subsequently marked, target areas.

Material can also be applied across subaqeous (and subaerial) surfaces using the conveyor while operated from a shore-based position. Conveyor operations and QC procedures are typically the same during shore-based conveyor operation as during barge-based operation. Belt speeds and boom positions can continue to be controlled remotely, with periodic re-positioning of the conveyor on shore required to cover an entire target area. During shore-based conveyor use, the hopper can be filled using a front-end loader to transfer material from nearby stockpiled areas into the conveyor hopper.

EXAMPLE 10

Material can also be applied into targeted, subaerial locations or subaqeous areas of freshwater or saline aquatic environments using a helicopter equipped with specially designed "drop bags" for conveying material to and applying the material within targeted locations.

Prior to using this technique for material application, and similar to material applications using a conveyor, target areas can be pre-marked across the water or land surface to facilitate controlled and accurate application of material. Additionally, relevant deployment-related parameters, including appropriate bag load size, helicopter flight speed and drop height, can also established and optimized during pre-application testing activities. A ground-based QC technician documenting helicopter application activities typically maintains direct radio communications with the helicopter crew, which facilitates accurate and proper application of the material.

To accomplish material application using the helicopter, multiple drop bags—specially designed for aerial deployment—can first be filled with the appropriate material using a front-end loader, a grain hopper—into which the material is placed—and a forklift, which holds an empty bag open and in place to receive the transferred materials.

Once filled, each bag can then be transferred to a nearby weighing area, off-loaded, hooked to multiple cables, lifted from the ground, and weighed using an in-line scale. Bags are weighed to facilitate material application into targeted areas at the appropriate rates, and to also insure safe helicopter transfer of the material.

Filled and weighed bags are transferred to an adjacent staging area where they are placed in line in preparation for deployment. Other, less time-consuming methods can also be used to fill bags within the deployment staging area (e.g. using a bobcat or the conveyor), thus removing the time-consuming steps of transfer and weighing.

With a ground-based bag crew assisting, deployment of bagged material typically involves hooking each full bag to a cable-release system attached to the air-borne helicopter. Once attached, the fill bag is lifted from the ground and flown from the staging area to the target application area.

Once in place over the target application area—and flying at the appropriate altitude and speed—a designated helicopter crew member deploys the bag's contents through operating the cable-release system, as assisted by the ground-based QC technician, as needed.

Once a given bag load is deployed, the empty bag is returned to the staging area, offloaded and placed to the side for later re-filling, and a full drop bag immediately hooked in its place. The next full bag is then flown back to the target application area, deployed, and the empty bag returned.

EXAMPLE 11

Material can also be applied into targeted, subaerial locations or subaqeous areas of freshwater or saline aquatic environments using a clamshell bucket attached to a crane, which can be operated from either barge- or shore-based positions.

As during material applications using the conveyor and helicopter techniques, a QC technician typically assists with material coverage into marked, target areas through direct communication with the crane operator. And as with conveyor operations, the barge- or shore-based crane is also re-positioned to continue product deployment, once a particular area has been adequately covered from a given location.

Description of Techniques for Implementing the Composite Particles

Using one or more of the application techniques described above, the composite particle technology can be implemented in a variety of ways, and in a variety of subsurface and subaqueous freshwater or saline, wetland or deepwater environments, in order to serve various functions. These functions, which are described below within the context of several specific examples of composite-particle implementation, are all either wholly or largely related to the inherently cohesive, low-permeability, and/or chemically reactive properties of the composite particles, once the material is applied and hydrated. The particular composite particle formulation used for a given implementation scenario will depend on a variety of factors such as specific project goals and numerous site-specific conditions—including water salinity levels.

EXAMPLE 12

Use of AQUABLOK to Enable In-Situ Treatment of Contaminated Sediments through Injection and Extraction Processes Problem Statement:

Contaminated sediments occur in wetland as well as deepwater (non-vegetated) environments characterized by freshwater or saline conditions. Remedial dredging and removal of sediments is an often used ex-situ approach for addressing this issue. A number of environmental impacts are known to be associated with remedial dredging, including re-suspension of contaminated sediments into the overlying water column and incomplete removal of sediment contaminants from the uppermost, and most biologically active, sediment layers. Remedial dredging of wetland sediments, in particular, could also severely impact or destroy a wetland ecosystem and compromise related wetland functions. Therefore, other less-invasive but equally effective remediation technologies, or alternatives, for addressing contaminated sediments occurring in deepwater or wetland environments are needed.

Current Approach to Addressing Problem:

As a non-intrusive alternative to remedial sediment dredging, contaminated sediments can be treated in place, or in-situ. Using such an approach, sediment contaminants can be treated without extensive physical disturbances that can contribute to significant re-suspension of contaminated sediments. In-situ treatment can be accomplished through implementation or promotion of chemical, biological, and/or sediment immobilization processes, most or all of which can occur under either aerobic or anaerobic conditions.

Chemical treatment processes generally involve the addition of strong oxidants (e.g., ozone, hydrogen peroxide, or permanganate) into sediments to destroy organic contaminants. Biological treatment processes (or bioremediation) generally involves addition of a variety of constituents into sediments (including oxygen, nutrients, pH adjusters, and/or microbe-containing inoculants) to enhance biological degradation of organic contaminants. Phytoremediation is a particular type of in-situ biological treatment involving plant growth and subsequent degradation of organic contaminants within the biologically active rooting zone; this process can also be used to extract and remove inorganic contaminants (e.g. metals) from contaminated sediments. And, finally, contaminant immobilization processes, including solidification or stabilization, can be implemented which generally involve solidification of the sediment mass and/or conversion of organic/inorganic contaminants to less soluble or mobile phases.

Current practice for delivering chemical, biological, and/or immobilizing substances (collectively referred to herein as "reagents") into an in-place sediment mass generally involves injection of reagents directly into the sediment body using a rake-like, mechanical injection boom apparatus that is apparently dragged through sediments at varying depths.

In-situ sediment treatments, as described above, can be less effective than ex-situ treatment methods primarily due to a lack of process control, i.e. the uniform delivery of reagents, at adequate dosage, throughout the contaminated sediment mass. An inability to control the flow of reagent-bearing pore waters through the sediment mass also limits efficient contact between reagents and contaminants bound to immobile sediment-particle surfaces; limited flow control also precludes removal of dissolved contaminants and/or reaction products from the sediment body, essentially limiting the effectiveness of in-situ treatment to processes that degrade organic contaminants in place. Finally, an overall lack of system control also minimizes the ability to uniformly create aerobic conditions (under which microbes can typically degrade organic contaminants more effectively), and also limits the effective removal of gases (e.g. methane and sulfides) which may result from in-situ chemical and biological processes.

Adverse environmental impacts can also result during in-situ chemical treatment of sediments, given a general lack of process control. During the injection process, potentially toxic chemicals or other treatment reagents can be released directly into the overlying water column, potentially harming related deepwater or wetland organisms. Once injected into the sediments, chemicals can also diffuse up into the water column, not only reducing their effective residence time in the sediment targeted for treatment, but also potentially impacting surface-water quality as well. Use of a rake-like injection boom process could also re-suspend contaminated sediments (and treatment chemicals) into the overlying water column.

Finally, the lack of process control during in-situ treatment of sediments precludes controlled and accurate monitoring of the true effectiveness of in-situ treatment techniques—including tracking effectiveness of natural recovery processes. A variety of naturally occurring processes (e.g. bioturbation, diffusion, advection, and sediment erosion/deposition) also typically occurs in a dynamic aquatic ecosystem, concurrent with in-situ treatment. Through any one or more of these natural processes, contaminant concentrations in sediments could be reduced, for example, through diffusion into the overlying water column or through erosional losses of contaminated surficial sediments. Such occurrences, if uncontrolled or not clearly identified and quantified, could greatly complicate interpretations of true, treatment-driven reductions in contaminant mass in sediments.

Figure 3:
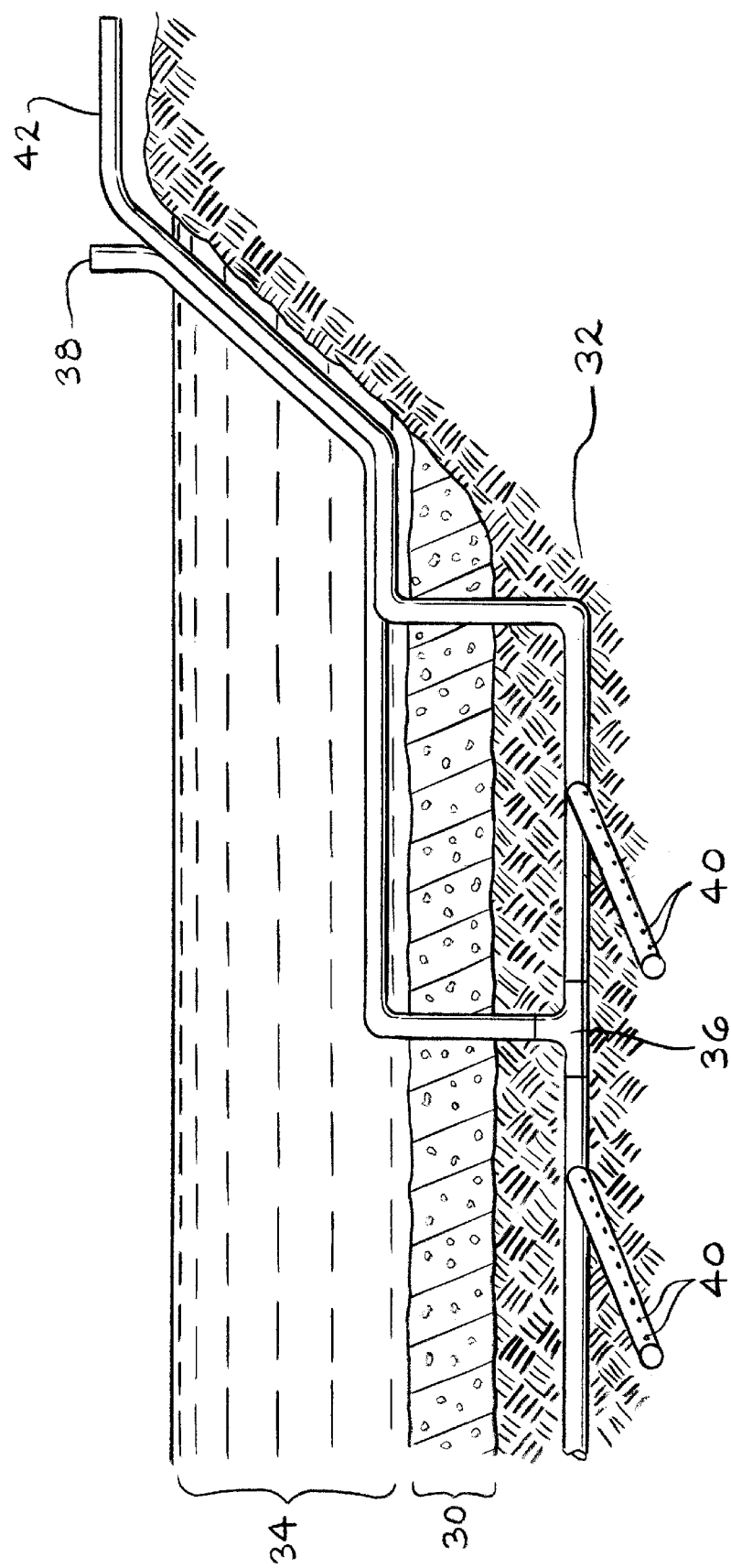
FIG. 3 a side view, partially in cross-section, of a method for in-situ sediment treatment by injection and contaminant extraction from beneath a barrier layer or cap in accordance with the invention.

General Description of this AOUABLOK Implementation Method:

This particular method for AQUABLOK implementation, conceptually depicted in FIG. 3, generally involves placing an impermeable AQUABLOK cap 30, of appropriate thickness, over the top of wetland or deepwater sediments 32 occurring in freshwater or saline environments. As shown in FIG. 3, the AQUABLOK cap 30 is placed under a water column 34. Prior to, during, or following cap placement, a system of interconnected, variably oriented, and appropriately spaced pipelines 36 are installed under the cap and throughout the sediment body. Portions of the pipeline system 36 would also be extended outside of the sediments, and accessible from on-bank positions. FIG. 3 shows a port 38 for reagent delivery and/or extraction. Pipe sections in direct contact with the sediment can have perforations 40 to allow for passage of flowable treatment reagents into the sediments 32; delivery of reagents into sediments could be optimized by incorporating specially designed diffusion devices located at approximate intervals along the piping system, in lieu of using perforated piping. The piping system would also allow for extraction and removal of sediment pore waters (containing dissolved contaminants, reaction products, etc.) from the saturated sediment body.

Depending on its design and configuration, site-specific hydrologic conditions, the type(s) of in-situ treatment processes being invoked, and the particular contaminant(s) targeted for treatment, such piping systems could generally be operated for any one or more of the following purposes: (1) as conduits for injection of treatment reagents into the sediment mass; (2) as conduits for venting gas reaction products from the treated sediments, or for injecting air into the sediments to promote aerobic biodegradation processes; and/or (3) to control and/or induce pore-water flow through sediments via injection of treatment reagents into one portion of the piping system and concurrent extraction of reacted sediment pore waters from other portions of the system. Reacted pore-water volumes, once extracted using the piping system, can be removed to a bank-based treatment system for further chemical or biological treatment. FIG. 3 shows a pipeline 42 to a bank-based treatment system. To maintain equilibrium hydrologic- and pressure-related conditions within the sediment body, treatment reagents and/or water volumes could be injected into the piping system at a rate equivalent to the rate of removal of reacted sediment pore waters, as adjusted to reflect natural stream discharge or recharge flows.

Figure 4:
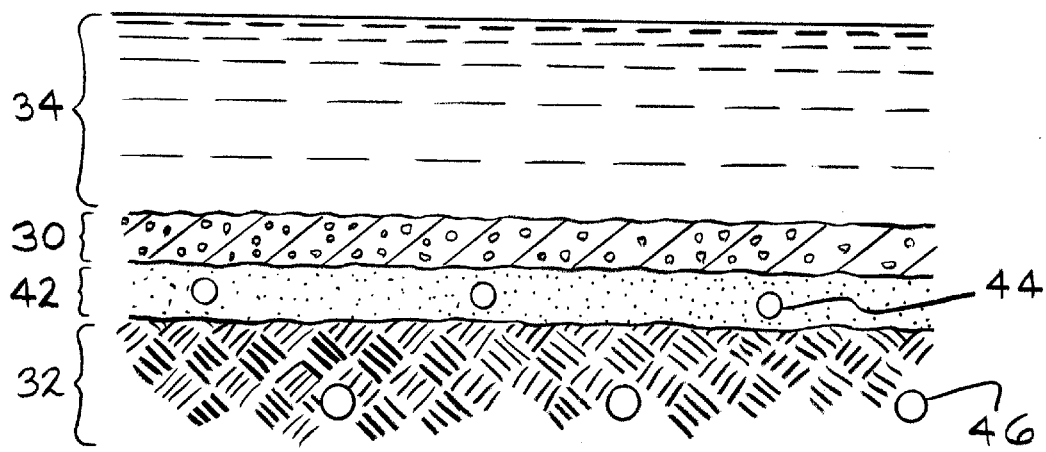
FIG. 4 is a side cross-sectional view of another embodiment of the sediment treatment method of FIG. 3.

In some implementation scenarios, operation of the described piping system 36 could be facilitated through installation of a granular, permeable drainage layer 42 directly beneath the impermeable AQUABLOK cap (see FIG. 4); such drainage layers could not only assist in pore-water removal from the sediment system, but could also be utilized for in-place cycling of pore water and reagent volumes during treatment processes. FIG. 4 shows an injection/extraction system 44 in the permeable drainage layer 42, and an injection/extraction/sparging system 46 in the contaminated sediments 32. The system could also be operated without a permeable layer 42.

Figure 5:
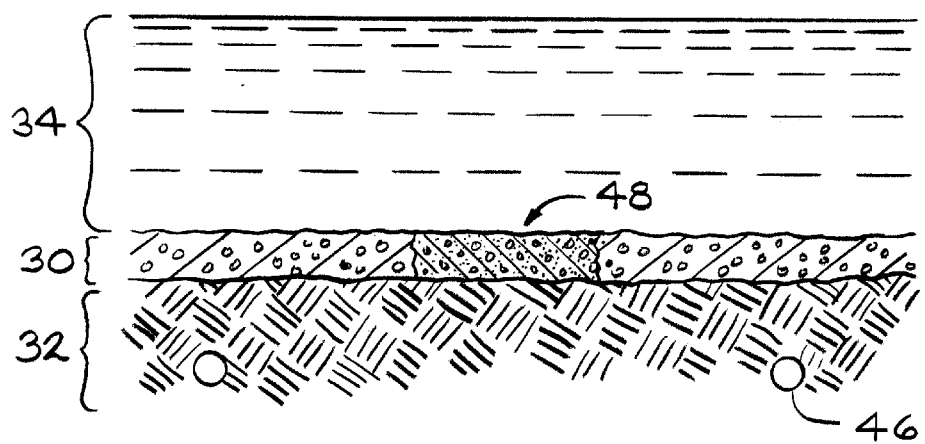
FIG. 5 is a side cross-sectional view of another embodiment of the sediment treatment method of FIG. 3.

At deepwater or wetland sites characterized by upwelling of ground water (flow from the sediments into the overlying water column), a relatively impermeable AQUABLOK cap 30 could be placed across selected portions of the site while a more permeable and reactive AQUABLOK 48—modified to include one or more treatment reagents—would be installed as "treatment areas" in other portions of the site. By "more permeable" is meant that the AQUABLOK, when hydrated, has a water permeability of greater than $1\times10^{-7}$ cm/sec. under a minimum hydraulic gradient of 1 cm/cm. Such a relatively permeable, yet reactive AQUABLOK formulation could be prepared through combining variable proportions of one or more clay minerals, pozzolanic materials, activated carbon, other clay-sized materials, and/or sand-sized material. Typically, the more permeable AQUABLOK formulation would be prepared by utilizing a higher percentage of sand-sized particles, although some clay materials are more permeable, such as non-reactive clay materials. The specific composition of such a relatively permeable yet reactive formulation would be the function of a variety of factors including the types of contaminants involved, site-specific conditions such as water salinity level, and project goals. Such a spatial array of strategically placed AQUABLOK caps would assist in promoting lateral flow of treatment reagents and sediment pore waters through the sediment mass 32 (beneath impermeably capped areas) and towards the more permeable and reactive treatment areas. This approach is conceptually similar to the "funnel and gate" technique used to treat ground water contamination (see FIG. 5). This approach can be used with or without an underlying drainage layer 42. The illustrated arrows demonstrate the potential for circulating the overlying water column 34 through the sediments 32.

As an alternative approach where ground water does not discharge into sediments, surface water overlying the sediments can be re-routed and injected through the piping system to effectively flush the sediment body by providing a controlled flow through the sediments and towards the relatively permeable treatment "gates". Less-than-optimal environmental conditions (e.g. surface water quality) may prevail in treatment gate areas, regardless of whether recharging or discharging conditions predominate at the site. Consequently, treatment gates could be positioned and operated so as to create minimal impacts to local floral and faunal communities and habitats.

Improvements Over Current Approach:

Placement of an AQUABLOK cap over the top of sediments creates a relatively impermeable barrier to vertical water flow across the sediment/water-column interface. The creation of such a barrier essentially "closes" the sediment system hydraulically—if not completely, then at least to a much greater extent than could be achieved using a more permeable, granular capping material; AQUABLOK'S substantial erosion resistance relative to that of non-cohesive sands would also insure continued presence of the relatively impermeable cap at adequate thickness. Within the confines of this quasi-closed sediment system, a substantial degree of process control can then be achieved during implementing chemical, biological, and/or immobilization treatment methods—particularly when treatments are deployed within the context of one or more of the piping systems described above. Increased process control should translate directly into more effective in-situ treatment of contaminated sediments, regardless of what processes are being invoked.

The ability to control, and even induce, the flow of liquid treatment reagents through the sediment greatly increases contact between the reagents and contaminants bound to the surfaces of immobile sediment particles. The ability to control or dictate liquid flow also makes possible the extraction and removal of dissolved contaminants and/or potentially toxic reaction products; once removed from the sediment system, contaminant-bearing liquids could be routed to a nearby, bank-based treatment system in which ambient conditions (e.g. temperature, pH, dissolved oxygen content) can be controlled to optimize ex-situ treatment of the extracted pore waters. Increased ability to control or induce the flow of oxygen or other strong oxidants into and through the sediment mass also maximizes the potential for creating aerobic conditions in the sediment, which are often much more favorable (relative to anaerobic conditions) for affecting the biodegradation of many organic contaminants. Greater system control during in-situ sediment treatment also increases the potential for effective removal of gases (e.g. methane and sulfides) which may result from in-situ treatment processes.

This implementation method could also improve the effectiveness of in-situ treatment technologies by providing for a more targeted (and effective) application of reagent volumes into the sediment mass, in that wastage of applied reagents, through loss or diffusion from the sediment mass into the overlying water column, could be minimized. With a relatively impermeable cap like AQUABLOK in place, even relatively soluble contaminants also remain concentrated within the area being treated; maintaining higher concentrations of certain organic contaminants within the treatment area could promote the eventual development (through mutation and natural selection) of microbial species or strains that are especially effective in biodegrading one or more contaminants—even without the addition of more readily degradable food substrates or nutrients.

Through creating a closed sediment system, this implementation method would also enable more controlled and accurate monitoring of the true effectiveness of in-situ treatment techniques—including monitoring of natural recovery processes.

Application of an impermeable AQUABLOK cap over sediments as a component of an in-situ treatment approach would also greatly minimize collateral damage of added reagents to the overlying water column. The use of an immobile piping system for reagent injection—rather than a rake-injection boom system—would also greatly minimize re-suspension of contaminated sediments into the water column.

Finally, an applied AQUABLOK cap could also serve as viable substrate for floral and faunal colonization, while concurrently and actively assisting in in-situ treatment processes. Seeds of wetland plants and/or nutrients could also be added to the formulation to promote plant growth and establishment in treated wetland systems.

EXAMPLE 13

Use of AQUABLOK to Facilitate Phytoremediation-Driven Remediation of Sediments Contaminated by Organic Compounds Problem Statement:

Contaminated sediments occur in wetland as well as deepwater (non-vegetated) environments characterized by freshwater or saline conditions. Dredging and removal, an often used ex-situ approach for remediating contaminated sediments, would severely impact or destroy a wetland ecosystem and compromise related wetland functions. Therefore, other less-invasive but equally effective remediation technologies, or alternatives, are needed.

One Current Approach to Addressing Problem:

Remediation of wetland sediments in place, or in-situ, offers a substantially less-invasive approach to sediment cleanup than dredging and removal. A variety of in-situ remedial techniques are recognized, including: natural recovery (or attenuation), capping, or treatment of sediment-borne contaminants through initiating or promoting chemical, biological, and/or contaminant immobilization processes.

One particular type of in-situ biological treatment technique appropriate to freshwater or saline (including brackish) wetland ecosystems in particular is phytoremediation. Phytoremediation involves the growth of hydrophytic (wetland) plants to affect degradation or removal of sediment-borne, organic and inorganic contaminants. Through the process of plant growth, contaminants located throughout the plant's microbially rich rooting zone (or rhizosphere) are effectively reduced, detoxified, and/or taken up by the plant and either metabolized or volatilized.

One or more in-situ techniques, including phytoremediation, could be applied within the same wetland system (either concurrently or sequentially) to affect sediment remediation. For example, sediment contaminant levels may be so elevated that in-situ capping alone may present an unacceptable long-term risk; in these cases, phytoremediation in conjunction with capping can reduce such risks to acceptable levels over time.

Although phytoremediation may remediate contaminants within the majority of the sediment mass, contaminated sediment located between plant shoots remains exposed to benthic invertebrate organisms inhabiting wetland sediments. The potential also exists for contaminant diffusion from sediments into the overlying water column, which could adversely impact chemical conditions within the overlying water column.

Additionally, many wetland environments are hydrologically transitional in nature, and can be subjected to periodic high surface-water flow velocities that may remove established plants and seed beds. The uncontrolled growth of invasive and aggressive wetland plant species that are less effective at phytoremediating targeted sediment contamination could also reduce the overall viability of this remediation technique as well.

Figure 6:
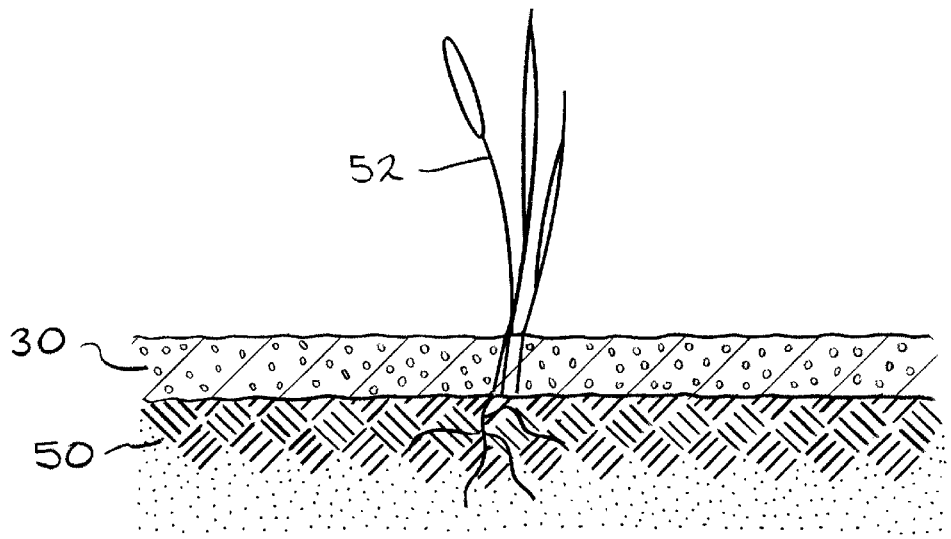
FIG. 6 is a side view, partially in cross-section, of a method of phytoremediation of organic contaminants beneath a sediment cap in accordance with the invention.

General Description of this AQUABLOK Implementation Method:

This particular method for AQUABLOK implementation, depicted graphically in FIG. 6, generally involves placing an AQUABLOK cap 30, of appropriate thickness, over the top of freshwater or saline wetland sediments 50 as well as the existing wetland vegetation 52. Based on documented field observations, existing wetland vegetation will grow up through the AQUABLOK capping material 30 in more lily capped areas. Vegetation can also germinate from seed-bearing sediments deposited over the top of the cap over time, and grow within (and through) the capping material, without significantly compromising its ability to act as a barrier.

Figure 7:
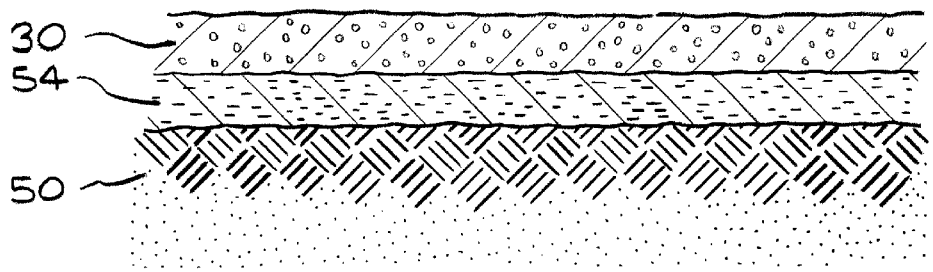
FIG. 7 is a side cross-sectional view of another embodiment of the phytoremediation method of FIG. 6.
Figure 8:
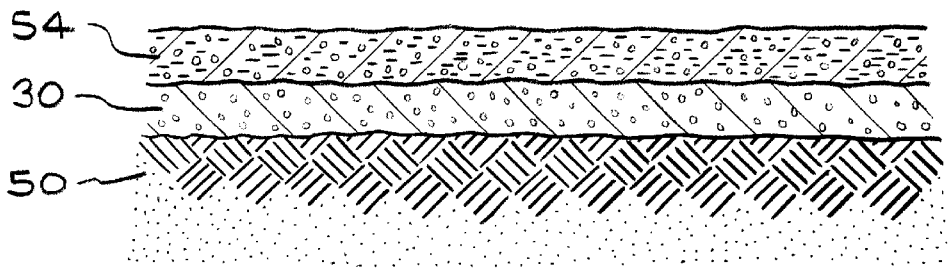
FIG. 8 is a side cross-sectional view of another embodiment of the phytoremediation method of FIG. 6.

In order to offer a more immediately viable capping substrate to more readily promote root penetration through the cap and into the underlying contaminated sediments, an initial layer of AQUABLOK 54—amended with organic and nutrient materials—could be applied first, followed by a non-amended and inherently organic-poor (typically less viable) AQUABLOK layer 30 overtop (FIG. 7). Depending on the plant types(s) targeted for growth, the layers 30, 54 could also be reversed to promote shallower or deeper growth of plant roots (FIG. 8).

Seeds of appropriate wetland plant species can also be incorporated directly into AQUABLOK formulations (along with nutrients) prior to sediment capping, thus promoting the growth of effective phytoremediators within selected and targeted areas of a site.

Improvements Over Current Approach:

The AQUABLOK implementation technique generally described above would minimize direct exposure of benthic invertebrate organisms to contaminated sediments during the phytoremediation process. It would also minimize diffusion of dissolved contaminants into the overlying water column, in that AQUABLOK displays very low permeability.

AQUABLOK, which is a relatively erosion resistant substrate, also can provide a better "bed" for holding wetland plants in place within areas of a site characterized by periodically higher surface-water flow velocities. This attribute of AQUABLOK, along with the potential for incorporating seeds and nutrients to product formulations, allows for a greater degree of control over what types of wetland plant species are grown for phytoremediation purposes, and where than can be grown on site.

Finally, use of AQUABLOK would offer a viable and physically similar substrate for floral and faunal colonization, when compared to sand—another potential, but more highly permeable and erodable capping material. Empirical field and laboratory observations also indicate that a continuously hydrated and "self-healing" seal forms, and remains, around the plant shoot/AQUABLOK interface; this seal would minimize the upward or downward transfer of water-or sediment-borne contaminants.

EXAMPLE 14

Use of AQUABLOK to Affect a Hydraulic Seal in Subsurface or Subaqueous Environments Problem Statement:

When subsurface pipelines (including culverts) are installed, the pipelines are typically bedded in stone or sand bedding material that can act as a conduit for the migration of water and/or contaminants. In the case of pipelines piercing a dam or levee, a continuous hydraulic (low-permeability) seal is required between the pipe and its immediate surroundings; such a seal minimizes the potential for leakage of municipal water supplies. In the case of contaminated site remediation, sewage, petroleum products, or other contaminants can flow through the bedding material into adjacent geologic or soil material. The greatest potential for leakage typically occurs at joints between pipe sections, although leakage can also occur along the pipe body, where cracks or ruptures have developed. Effective pipeline sealing also minimizes the potential for movement of ground waters or other fluids into the conveyance structure, which could have particular relevance in areas where ground water tables are high (such as in wetlands) and/or where ground water is contaminated.

A low-permeability, hydraulic seal is also required during the construction of ground water monitoring and extraction wells and in the petroleum and brine drilling and extraction industry to minimize the potential for vertical transfer of contaminated ground water, oil, or brine along the well's annular space. Such transfers could result in pollutant migration into adjacent aquifers.

Creation of a hydraulic barrier along the bottoms of freshwater or saline ponds, reservoirs, or lagoons is also beneficial in minimizing leakage losses from the surface-water body, and in minimizing potential impacts to ground water when the water body or underlying sediment contains dissolved contaminants.

Current Approaches to Addressing Problems:

Affecting a continuous hydraulic seal during pipeline installation: During pipeline installation, current practice typically involves backfilling a shallow excavation or trench, into which a pipe has been bedded in stone or sand. Appropriate backfill material—often a relatively permeable sand or in the case of dams and levees, a low-permeability soil material—is placed, in lifts, into the excavation atop and adjacent to the piping and tamped to the appropriate level of compaction using small or hand-operated equipment.

Prior to and/or during pipeline installation, anti-seepage collars are installed around pipe joints to minimize seepage from these particularly vulnerable portions of the pipeline. Anti-seepage collars usually consist of engineered plates or rings fastened around the entire perimeter of the jointed pipe. In addition to retaining the potentially valuable fluid being conveyed (e.g. during oil transport), minimizing seepage from joints or other breaches along the pipe also minimizes the potential for localized "piping". Piping is a subsurface erosional phenomenon characterized by the formation of large voids (or pipes) in backfill or bedding material (and also perhaps in adjacent, intact substrate) which results from the progressive washing-away of soil particles. Extensive piping can result in physically unstable conditions within a trench and eventual collapse or rupture of the line contained therein. Piping-related erosion can also result in the catastrophic failure of dams or levees through which pipelines have been installed.

Installation of anti-seepage collars at each jointed section along a significant expanse of pipeline, or at junctures where pipelines pierce dams or levees, can be a labor-intensive and costly endeavor. Preparation of a physically uniform, compacted body of backfill material that provides effective lateral support to the pipeline structure (as well as low permeability, if also needed) can also be a tedious and costly process. Non-uniform and/or inadequate compaction of backfill within a trench could potentially create physically unstable and/or permeable conditions that could ultimately result in differential settlement or lateral movement, and eventual pipe cracking or rupture.

Additionally, should significant piping-related erosional losses of backfill or bedding material occur, a trench would need to be re-excavated, the integrity of joints and anti-seepage collars inspected and repaired (as needed), and new bedding and/or backfill material installed; the repair of similar erosional losses in dam or levee systems could be significantly more involved. Depending on pipeline depth and regional climatic conditions, freeze/thaw or desiccation processes could also produce semi-permanent cracks or fissures within backfill material, which could also compromise effective pipe sealing.

Affecting a hydraulic seal in ground water, oil, or brine wells: Current practice for creating a hydraulic seal above a well's screened interval generally involves installation of a low-permeability, semi-solid cap directly over the top of sand or other granular material previously placed into the well's annular space, adjacent to the well screen. The cap is typically created by pouring an adequate quantity of pure, dry bentonite pellets or chips down the annular space and across the surface of the granular component. Water present in the formation hydrates the pellets, thus affecting material expansion and sealing of the annular space. Finally, a bentonite or concrete/bentonite slurry, also known as "grout" and typically characterized by a low bearing capacity, is tremie-piped over the top of the semi-solid cap. Well construction is then typically completed through application of a surficial concrete cap.

Construction of an effective bentonite cap directly over the top of (and contiguous with) the underlying granular unit can be complicated by a phenomenon known as "bridging". Bridging generally involves a "clogging" of bentonite pellet masses within upper reaches of the annular space during their application and descent through the space. This process results in formation of an ineffective bentonite cap positioned above, rather than contiguous with, the underlying granular surface; such a hydraulic gap could create pathways for the uncontrolled transfer of contaminated ground waters from one aquifer to another. Bridging can result from the addition of inadequate pellet quantities and at an inadequate rate, physically restricted annular spaces, and/or "rough" surfaces along the wall of the augured boring, which can restrict smooth descent of the granular bentonite material.

Minimizing leakage from ponds, reservoirs, or lagoons: Current practice for creating a low-permeability, subaqueous barrier across the bottom of newly constructed (or empty) ponds, reservoirs, or lagoons generally involves placement of a flexible membrane liner or a layer of dry bentonite (in powder, granular, pellet, or chip form) continuously across the bottom surface prior to water or wastewater additions.

In an effort to minimize leakage from already filled ponds, reservoirs, or lagoons, dry bentonite material is evenly applied across the water surface, above the targeted bottom area. The bentonite material descends through the water column, settles across the bottom surface, hydrates, and forms a low-permeability seal. Such a seal can also be created through tremie-piping a bentonite-based slurry through the water column and across the bottom surface. Creation of a seal of adequate uniformity and thickness using either of these methods is hampered by a general lack of control during bentonite application through the water column, which is related primarily to uncontrolled lateral dispersion of bentonite material—particularly when it is applied in slurry or powder forms.

Figure 9:
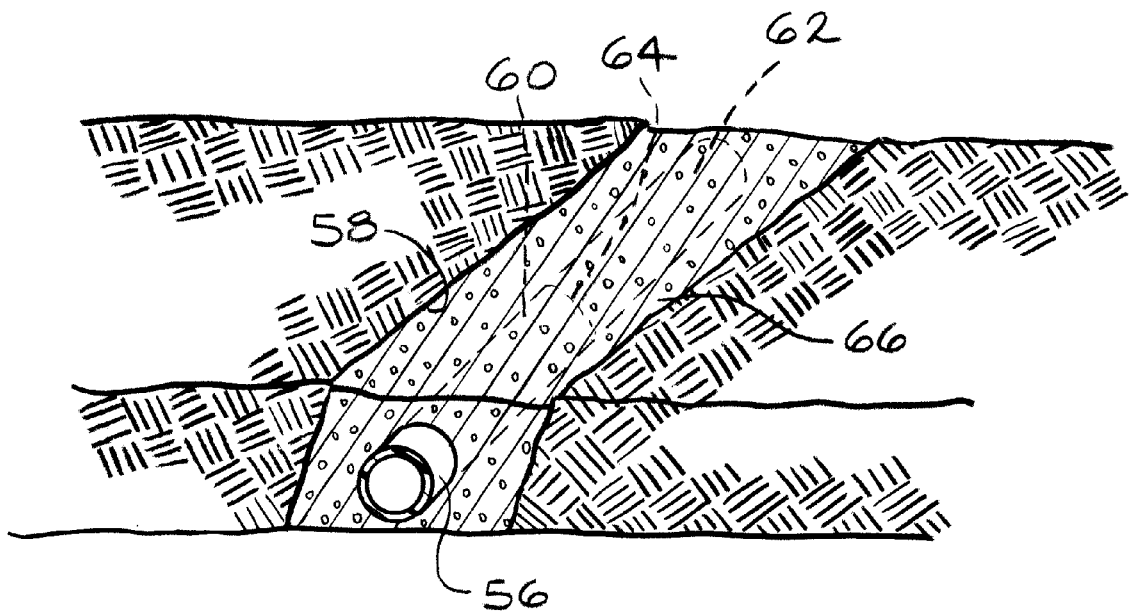
FIG. 9 is a perspective view of a method of sealing a subsurface pipeline in accordance with the invention.
Figure 10:
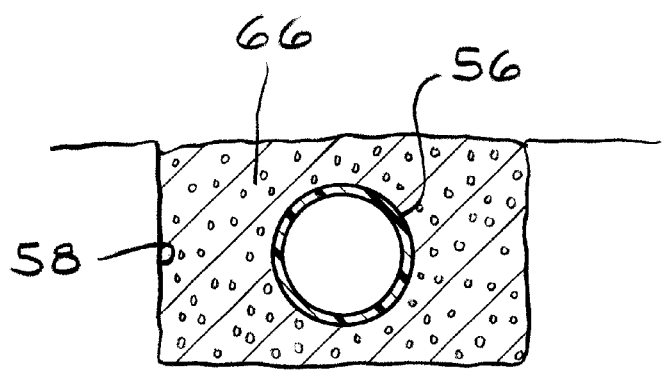
FIG. 10 is a side cross-sectional view of the pipeline sealing method of FIG. 9.

General Description of This AQUABLOK Implementation Method:

Affecting a continuous hydraulic seal during pipeline installation: AQUABLOK use as low permeability backfill and as a surrogate for engineered, anti-seepage collars during pipeline installation is generally depicted graphically in FIGS. 9 and 10. Once pipe 56 has been lain into an excavated trench 58 (or installed through a dam or levee structure) and piping sections 60, 62 physically connected together at a joint 64, an appropriate quantity of dry AQUABLOK particles is placed around and over the top of the piping, in a continuous and uniform manner. The product is then hydrated through water addition. Once hydrated, the applied AQUABLOK mass expands in all directions to form a low-permeability and uniform seal 66 along the pipe surface and within jointed pipe sections; a tight and uniform seal is also formed along sidewalls of the trench, which provides added stability to the pipe installation. If required for some projects, a relatively lean, aggregate-rich AQUABLOK formulation can also be used to provide added physical stability within the backfilled area, without compromising the product's ability to also act as an effective hydraulic barrier.

Figure 11:
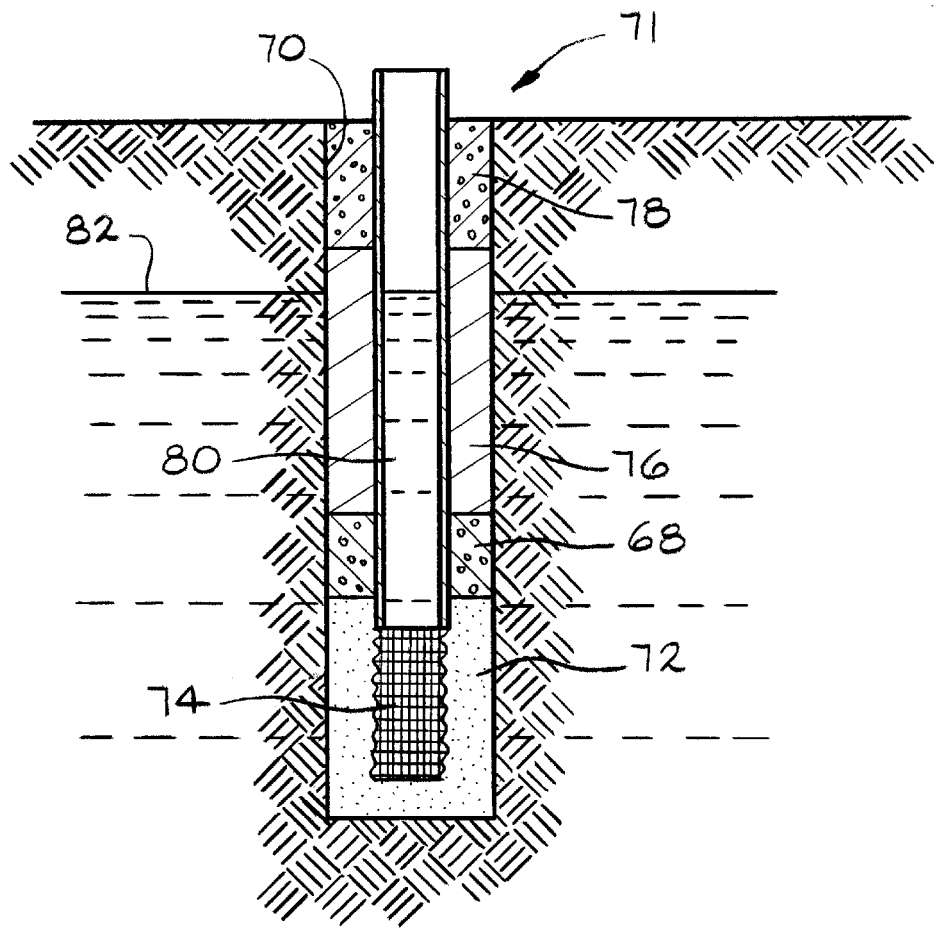
FIG. 11 is a side cross-sectional view of a method of sealing a well in accordance with the invention.

Affecting a hydraulic seal in ground water, oil, or brine wells: AQUABLOK use during well construction is generally depicted graphically in FIG. 11. In particular, AQUABLOK is used for construction of the semi-solid and low-permeability cap 68 within the annular space 70 of a well 71, as placed directly over the top of the granular component 72 such as sand. The granular component 72 is positioned within the screened interval of the well screen 74. Dry AQUABLOK particles are poured into the annular space 70 and hydrated in much the same manner as bentonite pellets or chips. The bentonite-based grout component 76 could also be replaced by AQUABLOK, in whole or in part, depending on site-specific conditions and goals for well construction. A layer 78 of concrete or additional grout is typically placed on top of the grout component 76. The layers surround the well casing 80. FIG. 11 also shows the ground water potentiometric surface 82.

Figure 12:
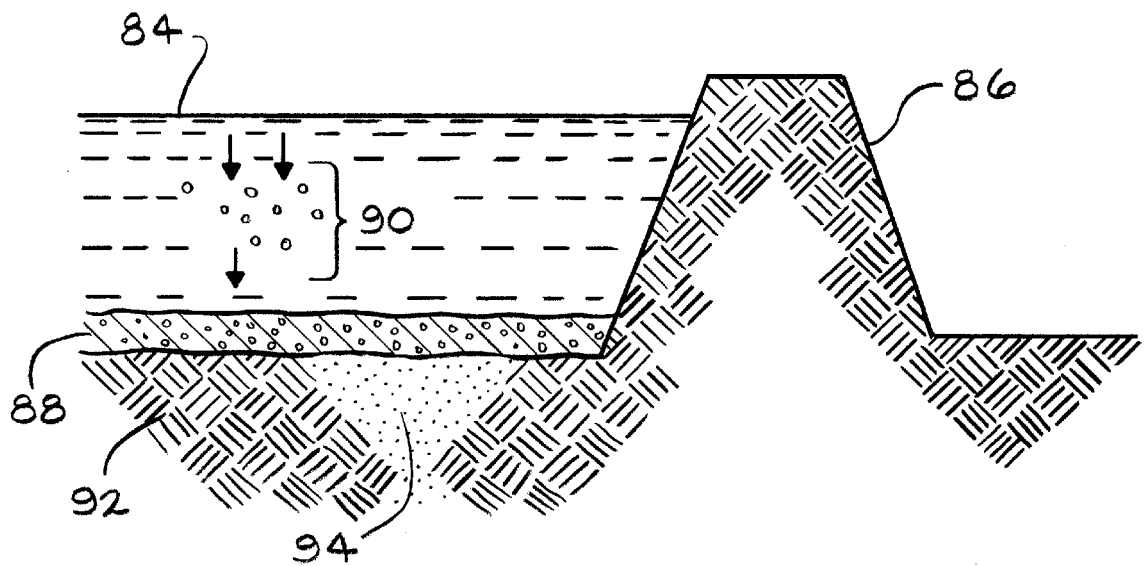
FIG. 12 is a side cross-sectional view of a method of minimizing leakage from a surface water body in accordance with the invention.

Minimizing leakage from ponds, reservoirs, or lagoons: Use of AQUABLOK in minimizing leakage from freshwater or saline ponds, reservoirs, or lagoons is generally depicted graphically in FIG. 12. In particular, FIG. 12 shows a surface water body such as a reservoir 84 contained by a dam or levee 86. A low-permeability, subaqueous barrier 88 is created by applying AQUABLOK continuously across a bottom surface, prior to filling, or by applying the product through an existing fresh or saline water column and across all or selected portions of the bottom surface, if the surface water body is already filled. FIG. 12 shows particles 90 of AQUABLOK being dropped onto the substrate 92 at the bottom of the reservoir, which may include relatively permeable formations such as a sand seam 94.

Improvements Over Current Approaches:

Affecting a continuous hydraulic seal during pipeline installation: AQUABLOK can create a low-permeability and resilient, continuous seal around the pipeline. Use of AQUABLOK as the principal backfill component would eliminate the need for laborious, incremental addition and compaction of typical soil material, and potential damage to the pipeline which could occur during compaction processes. The uniform, expansive forces created within the trench and against exterior pipe walls during product hydration would also help create physically stable conditions, particularly if aggregate-rich product formulations were applied. Use of AQUABLOK in place of multiple anti-seepage collars during pipeline installation in trenches or through dams or levees would also be a highly cost effective yet technically viable approach to pipeline installation. The low-permeability seal created around pipe joints would minimize the potential for seepage and subsequent, subsurface erosion; any localized seepage that did occur from joints or other pipeline breaches would maintain hydrated—and physically expanded—conditions adjacent to the breach, in the manner of a self-sealing material. Finally, formation of localized, climatically induced cracks or fissures in the AQUABLOK material would re-seal themselves upon thaw or rewetting, resulting in maintenance of a low-permeability seal.

Affecting a hydraulic seal in ground water, oil, or brine wells: Depending on site-specific conditions, well design, and project requirements, the settling velocity of AQUABLOK particles within the annular space can be significantly increased—relative to that of pure bentonite pellets or chips—by optimizing key settling-related variables (i.e., particle density, diameter, and shape) during AQUABLOK design and formulation. Use of such a relatively dense, bentonite-bearing product for construction of semi-solid caps would minimize bridging during descent through the annular space, enabling more effective placement of the reactive bentonite component directly atop the sand unit—thus resulting in formation of a continuous and effective well seal. Smaller-diameter, yet still relatively dense AQUABLOK particles can also be formulated to accommodate particularly narrow annular spaces. AQUABLOK can also be used in lieu of, or in combination with typical grouting material to affect a hydraulic seal elsewhere within a well, as dictated by site-specific hydrologic/hydraulic conditions, well design, and specific goals for well construction.

An additional advantage to using AQUABLOK instead of bentonite pellets for constructing a well seal is that mass flux of contaminants through an AQUABLOK cap is significantly lower than through a pure bentonite cap. The presence of impermeable aggregate cores in typical AQUABLOK formulations effectively lengthens the flow path and subsequently increases travel time for dissolved contaminants diffusing through the bentonite material; no such reduction in contaminant travel times occurs through a pure bentonite. Given this added benefit to AQUABLOK, less product can be used to create an effective sealing cap than may be required using pure bentonite material for the construction of well seals.

Minimizing leakage from ponds, reservoirs, or lagoons: The unique AQUABLOK design allows for effective and controlled delivery of adequate quantities of bentonite and other clay sized materials uniformly across the bottom surface, regardless of size or depth of the fresh or saline water body. The greater degree of control during bentonite delivery—compared to the relatively uncontrolled setting of many other bentonite-bearing materials—directly translates into construction of spatially continuous, low-permeability subaqueous caps of adequate uniformity and thickness.

EXAMPLE 15

Use of AQUABLOK to Physically Stabilize Concrete Block-Based, Erosion Control Products in Flowing-Water Environments Problem Statement:

High flow conditions can periodically occur along a variety of manmade and naturally occurring waterways, including along drainage ditches or channels, near culvert inlets and outfalls, and in some riverine environments. Such conditions can result in significant scour and erosional losses of exposed bottom substrates. Erosion of basal substrates can also subsequently result in failure of the conveyance system and, in some cases, detrimental buildup of displaced and re-deposited sediments in downstream locations.

One Current Approach to Addressing Problem:

An effective and commonly used method for channel protection and erosion control involves the installation of pre-cast, interlocking and articulating concrete blocks (of various thickness, shape, and size) along the bottom surface of a waterway. A variety of such engineered, erosion-control products are commercially available, including Tri-Lock, Channel-Lock, and Hydropave. To facilitate block installation and erosion control at some sites, blocks can be cabled together, forming a singular unit, or layer, atop the underlying substrate. Blocks can be designed, cast, and installed to include open spaces, or voids, within and between the interlocking units. Such open spaces provide relief from hydraulic pressures (when needed) and, in some cases, allow for vegetation growth across covered areas (which, in turn, further stabilizes the concrete layer). For certain applications, open spaces within and between blocks can also be minimized in order to minimize seepage losses, such as in cases when the blocks are used for lining water conveyance structures like aqueducts.

During block installation, a geotextile filter fabric is typically placed beneath the blocks and over the top of the underlying substrate, although a more open, geogrid material can also be used in place of geotextile. The primary function of the permeable geotextile or geogrid component is to minimize erosion of the underlying substrate while still allowing for water passage during hydraulic stabilization of the waterway system. Placement of geotextile or geogrid also provides a stable base for the concrete layer, especially when constructing over the top of relatively soft substrate, where the potential exists for significant differential settlement beneath the applied load.

Depending on the specific manner of its incorporation, use of a cohesive, clay mineral-based material as a component in block-based, erosion control systems can significantly increase substrate erosion resistance and/or add stability to the concrete layer unit during extreme flow events. Incorporation of a cohesive, low-permeability material as an underlying sealant layer would also greatly minimize seepage losses from concrete-lined conveyance systems. However, effective and controlled application of such cohesive material, particularly when a water column is present over the top of the substrate, can be logistically problematic, and especially if installed over soft substrate.

General Description of this AQUABLOK Implementation Method:

AQUABLOK can be incorporated into the design of concrete block-based, erosion-control systems installed in subaqueous waterway environments in several different ways. Depending on site-specific conditions and project goals, AQUABLOK can be: (1) applied between the geotextile or geogrid and the block-layer component; or (2) applied directly between the block layer and underlying substrate, in lieu of a geotextile or geogrid component.

Improvements Over Current Approach:

The AQUABLOK delivery system for conveying cohesive, bentonite-rich material to the bottom of inundated waterway systems enables incorporation of a cohesive layer into block-based, erosion-control systems. Incorporation of AQUABLOK into system designs, as generally described above, can greatly improve the overall effectiveness of this method for channel stabilization and erosion control through either significantly increasing adhesion between the concrete and geotextile or geogrid components (where none inherently exists), or through increasing adhesion between concrete blocks and the underlying substrate (where only limited adhesion may exist, such as when granular or silt-based substrates are involved). Increased adhesion—as promoted through addition of a highly cohesive material—translates directly into greater erosion control as well as increased stability of the engineered system overall. Installation of viable block-based erosion control systems can be particularly cost effective when AQUABLOK is used as a cohesive and stable leveling layer, in lieu of the expensive geotextile or geogrid component.

AQUABLOK can also provide for installation of particularly low-permeability (in addition to erosion resistant) block-based systems when constructing water conveyance structures in which seepage losses must be minimized.

Finally, void spaces within and between concrete blocks, where AQUABLOK material may be exposed in some application designs, would offer viable habitat for the growth of wetland plants and/or invertebrate benthic organisms. Plant growth within block-covered systems may also be promoted through incorporating seeds of wetland plants, and/or nutrients, into AQUABLOK formulations.

The principle and mode of operation of this invention have been described in its preferred embodiments. However, it should be noted that this invention may be practiced otherwise than as specifically illustrated and described without departing from its scope.

What is claimed is:

1. A method of treating a contaminated material comprising forming a low-permeability barrier over the contaminated material thereby creating a substantially hydraulically closed system and treating the material beneath the barrier by at least one of delivering a substance with a delivery device to treat the contamination and removing flowable material from beneath the barrier, wherein the contaminated material comprises a permanently or periodically subaqueous contaminated material occurring in deepwater or wetland environments characterized by freshwater to saline conditions.

2. A method according to claim 1 wherein the material is treated by at least one of a chemical treatment process, a biological treatment process, and a contaminant immobilization process.

3. A method according to claim 2 wherein the treatment is accomplished through the delivery of a flowable treatment material into the contaminated material.

4. A method according to claim 3 wherein the treatment material is delivered through a pipeline system.

5. A method according to claim 4 wherein the treatment material is delivered through perforations in the pipeline system or through diffusion devices attached to the pipeline system.

6. A method according to claim 3 wherein the treatment material is at least one of water, air, gases, oxidants, nutrients, pH-adjusters, and microbe-containing innoculants.

7. A method according to claim 3 wherein the treatment material is delivered by a punch-like delivery system.

8. A method according to claim 2 wherein the material is treated by a biological treatment process comprising a phytoremediation process.

9. A method according to claim 8 wherein the phytoremediation process is conducted by the growth of plants to bring about contaminant degradation or removal.

10. A method according to claim 1 wherein the low-permeability barrier is a barrier layer, and additionally comprising forming a permeable drainage layer beneath the low-permeability barrier layer.

11. A method according to claim 10 wherein the treatment is accomplished through the delivery of a flowable treatment material into the contaminated material, and comprising the additional step of cycling the treatment material between the contaminated material and the permeable drainage layer.

12. A method according to claim 1 wherein the treatment is accomplished by removing flowable material from the contaminated material.

13. A method according to claim 12 wherein the flowable material is at least one of contaminated water, gaseous reaction products, liquid reaction products, pure-phase contamination, and upwelling ground water.

14. A method according to claim 12 wherein the flowable material is removed through a pipeline system.

15. A method according to claim 14 wherein a portion of the pipeline system is perforated to facilitate the removal.

16. A method according to claim 14 further comprising transferring the flowable material through the pipeline system to a treatment system.

17. A method according to claim 12 wherein at least one of the rates of delivery of the treatment substance and removal of flowable material are controlled to maximize contact between the treatment substance and the contaminants.

18. A method according to claim 12 wherein at least one of the rates of delivery of the treatment substance and removal of flowable material are controlled to maximize contaminant removal.

19. A method according to claim 1 wherein first portions of the contaminated material are covered with the low-permeability barrier and second portions of the contaminated material are covered with a permeable material to create a funnel and gate system, and wherein movement of flowable material is promoted through the gates.

20. A method according to claim 19 comprising delivering a flowable material into the contaminated material, the delivered flowable material promoting the movement of flowable material through the gates.

21. A method according to claim 20 wherein the flowable material is delivered through a pipeline system.

22. A method according to claim 19 wherein the permeable material is prepared by combining one or more of sand-sized material, clay mineral, clay-sized or quasi clay-sized material, pozzolanic material, zero-valent iron, activated carbon, and microbes.

23. A method according to claim 1 comprising the additional step of monitoring the treatment of the contaminated material, the substantially hydraulically closed system facilitating the monitoring of the treatment.

24. A method according to claim 1 wherein the barrier serves as a habitat for benthic organisms.

25. A method according to claim 24 wherein at least one of organic material and nutrients are added to the barrier to enhance the barrier as a habitat for benthic organisms.

26. A method according to claim 1 wherein the barrier serves as a substrate for the growth of plants without the addition of plant nutrients to the barrier.

27. A method according to claim 1 wherein the barrier is formed as a barrier layer, and further comprising forming a modified barrier layer over the barrier layer, the modified barrier layer being formulated to provide habitat for at least one of plants and benthic organisms above the contaminated material.

28. A method according to claim 1 wherein the barrier is formed as a barrier layer, and further comprising forming a modified barrier layer between the barrier layer and the contaminated material, the modified barrier layer being formulated to promote plant growth within the contaminated material.

29. A method of treating a contaminated material comprising forming a low-permeability barrier over the contaminated material thereby creating a substantially hydraulically closed system and treating the material beneath the barrier by at least one of delivering a substance with a delivery device to treat the contamination and removing flowable material from beneath the barrier, wherein the low-permeability barrier is formed by applying a flowable material comprising a plurality of manufactured composite particles including a core and a sealant layer at least partially encapsulating the core, the sealant layer comprising sealant material capable of at least one of absorbing water, swelling and reacting to form the barrier, the composite particle having a specific gravity greater than one.

30. A method according to claim 29 wherein the core is less dense and softer than the sealant layer.

31. A method according to claim 29 wherein at least one of the core and the sealant layer contains an oxidizing agent.

32. A method of treating a contaminated material comprising forming a low-permeability barrier over the contaminated material thereby creating a substantially hydraulically closed system and treating the material beneath the barrier by at least one of delivering a substance with a delivery device to treat the contamination and removing flowable material from beneath the barrier, wherein the contaminated material comprises a permanently or periodically subaqueous contaminated material occurring in deepwater or wetland environments characterized by freshwater to saline conditions, and wherein the low-permeability barrier is formed by applying a flowable material comprising a plurality of manufactured composite particles including a core and a sealant layer at least partially encapsulating the core, the sealant layer comprising sealant material capable of at least one of absorbing water, swelling and reacting to form the barrier, the composite particle having a specific gravity greater than one.

* * * * *